March 20, 1951     J. J. NOONAN     2,545,670
MERCHANDISING APPARATUS

Filed May 13, 1946     15 Sheets-Sheet 1

INVENTOR
JOHN J. NOONAN
BY
ATTORNEY

March 20, 1951      J. J. NOONAN      2,545,670

MERCHANDISING APPARATUS

Filed May 13, 1946      15 Sheets-Sheet 2

INVENTOR
JOHN J. NOONAN
BY Wells R. Church
ATTORNEY

March 20, 1951 J. J. NOONAN 2,545,670
MERCHANDISING APPARATUS
Filed May 13, 1946 15 Sheets-Sheet 3
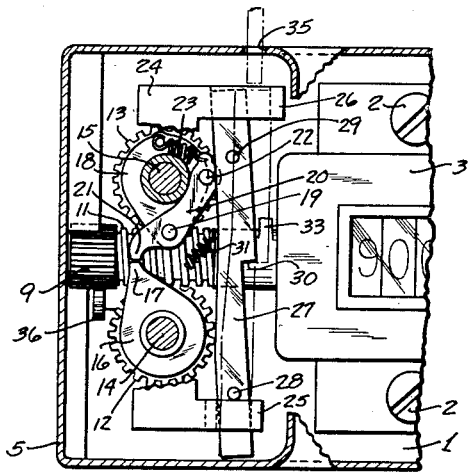
FIG. 8.
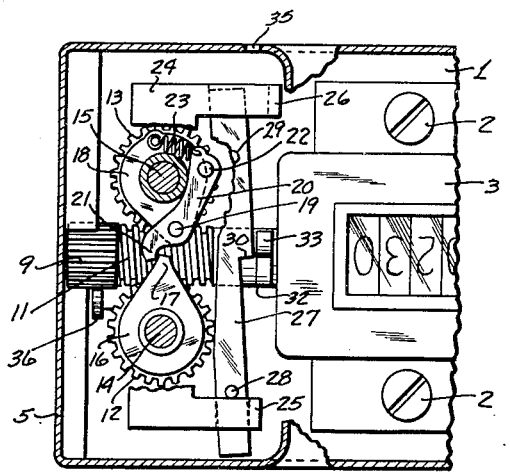
FIG. 9.
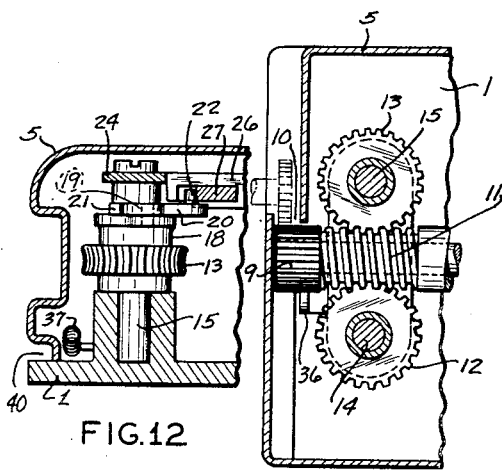
FIG. 12.
FIG. 11.
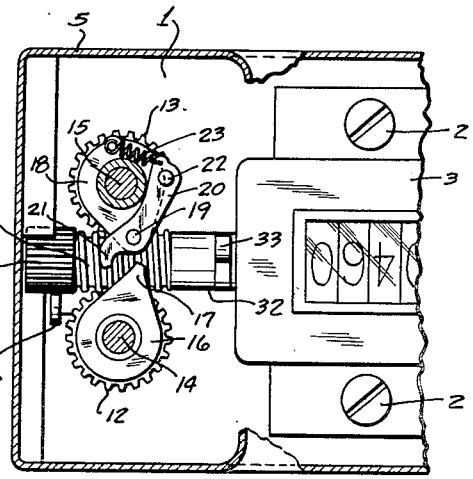
FIG. 10.
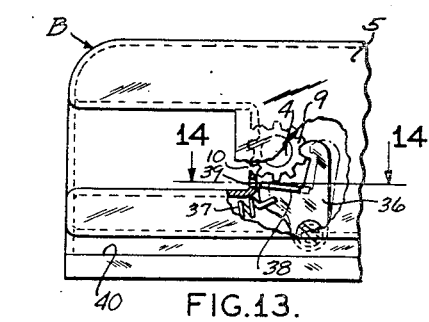
FIG. 13.
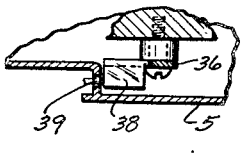
FIG. 14.
INVENTOR
JOHN J. NOONAN
By Nells R Church
ATTORNEY March 20, 1951    J. J. NOONAN    2,545,670
MERCHANDISING APPARATUS
Filed May 13, 1946    15 Sheets-Sheet 4
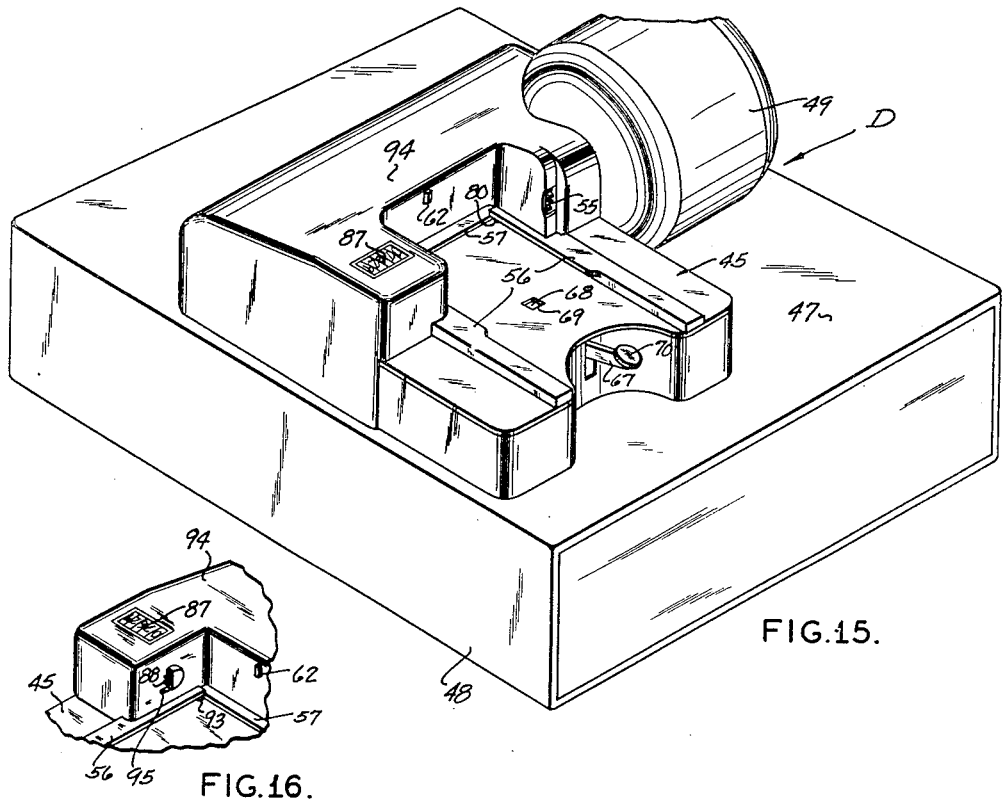
FIG.15.
FIG.16.
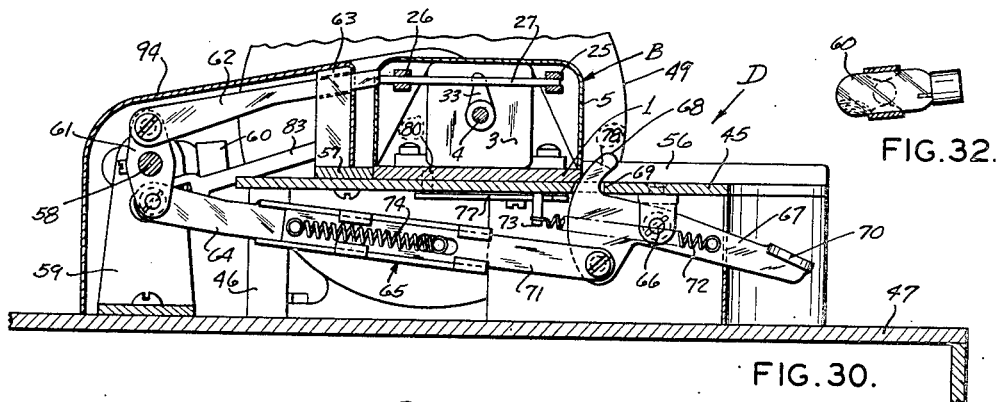
FIG.30.
FIG.32.
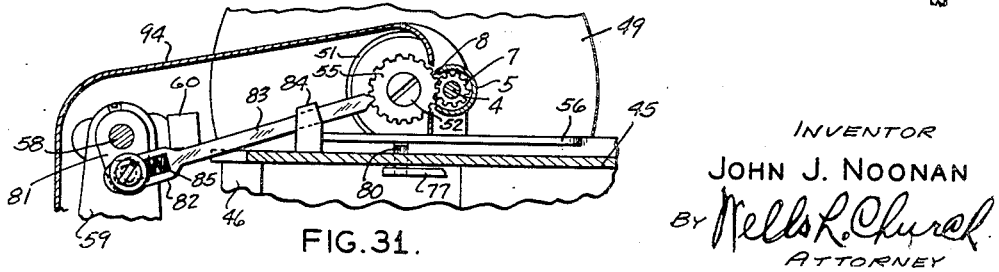
FIG.31.
INVENTOR
JOHN J. NOONAN
BY Wells R. Church
ATTORNEY

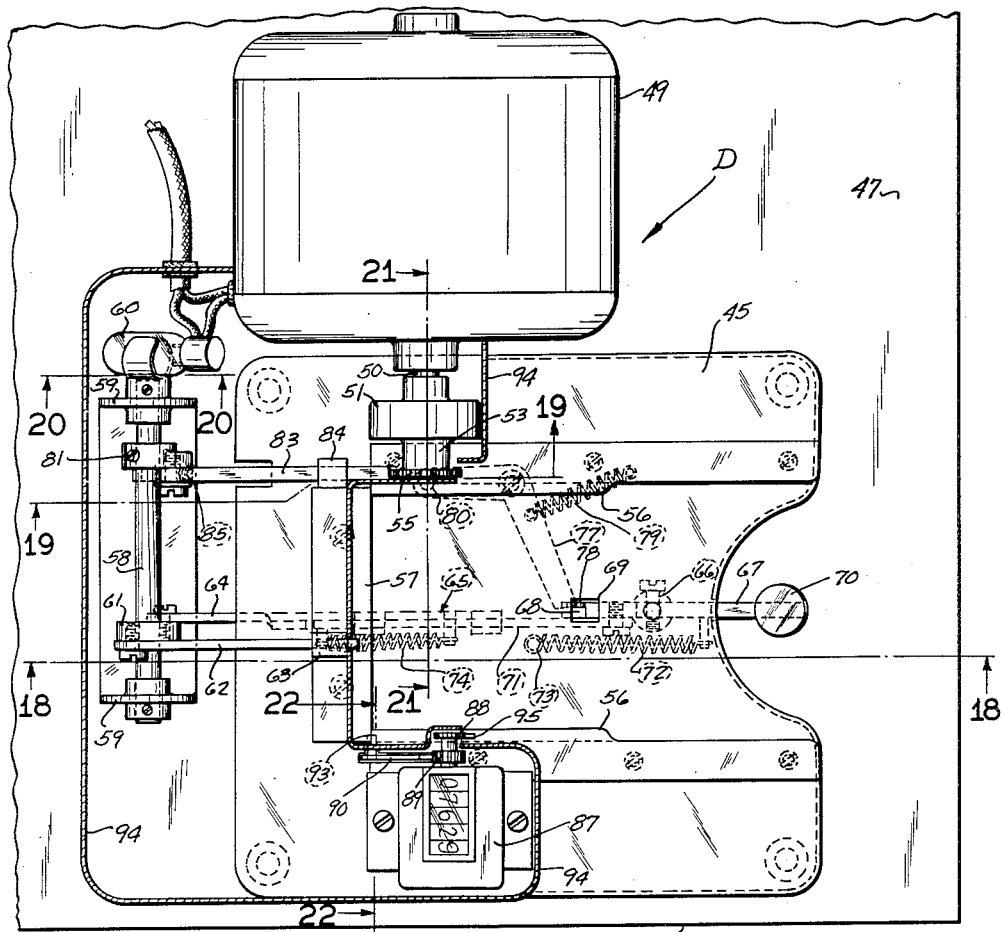

March 20, 1951 J. J. NOONAN 2,545,670
MERCHANDISING APPARATUS
Filed May 13, 1946 15 Sheets-Sheet 6
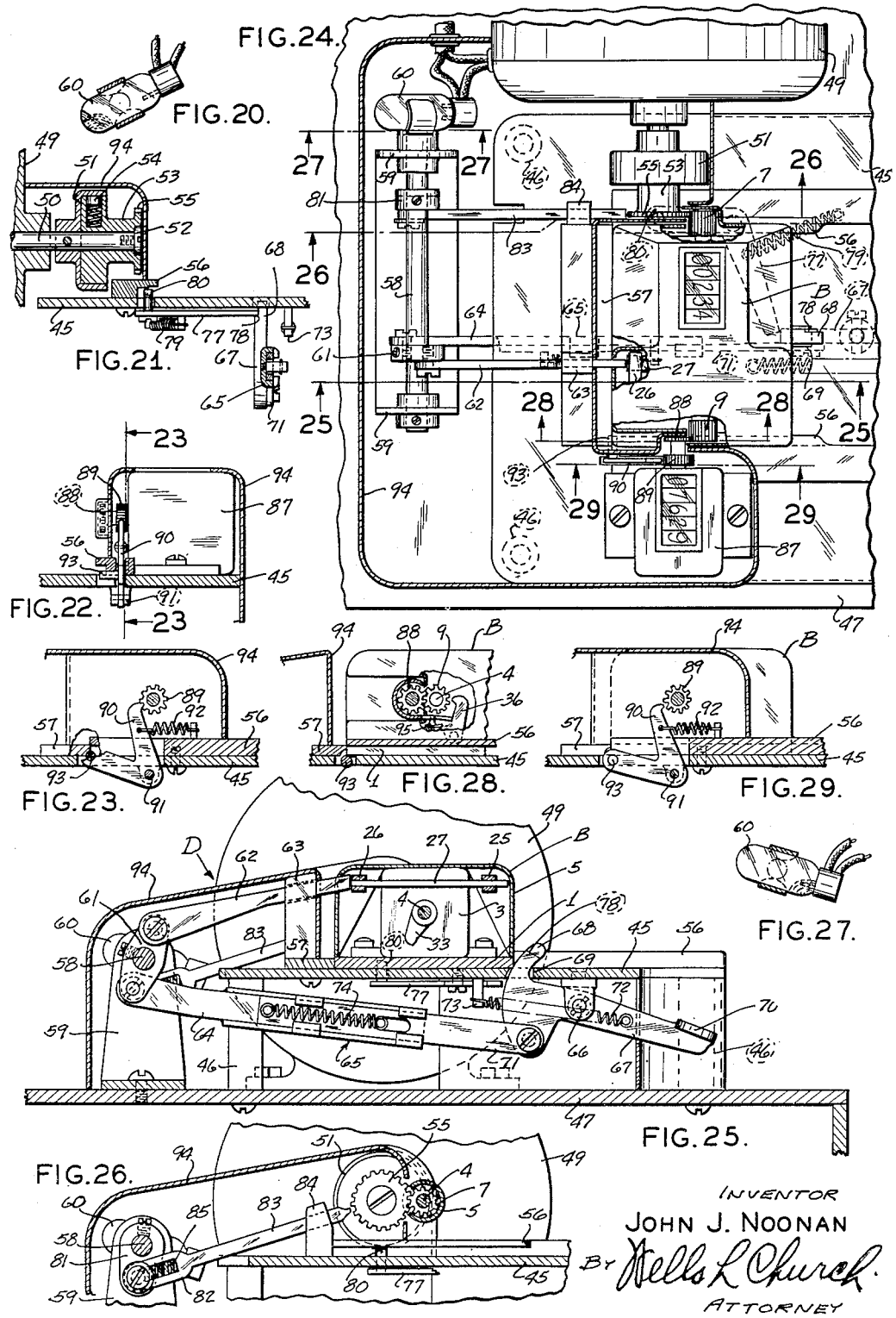
INVENTOR
JOHN J. NOONAN
BY Wells L Church
ATTORNEY March 20, 1951 J. J. NOONAN 2,545,670
MERCHANDISING APPARATUS
Filed May 13, 1946 15 Sheets-Sheet 7

INVENTOR
JOHN J. NOONAN
BY
ATTORNEY

March 20, 1951
J. J. NOONAN
2,545,670
MERCHANDISING APPARATUS
Filed May 13, 1946
15 Sheets-Sheet 8
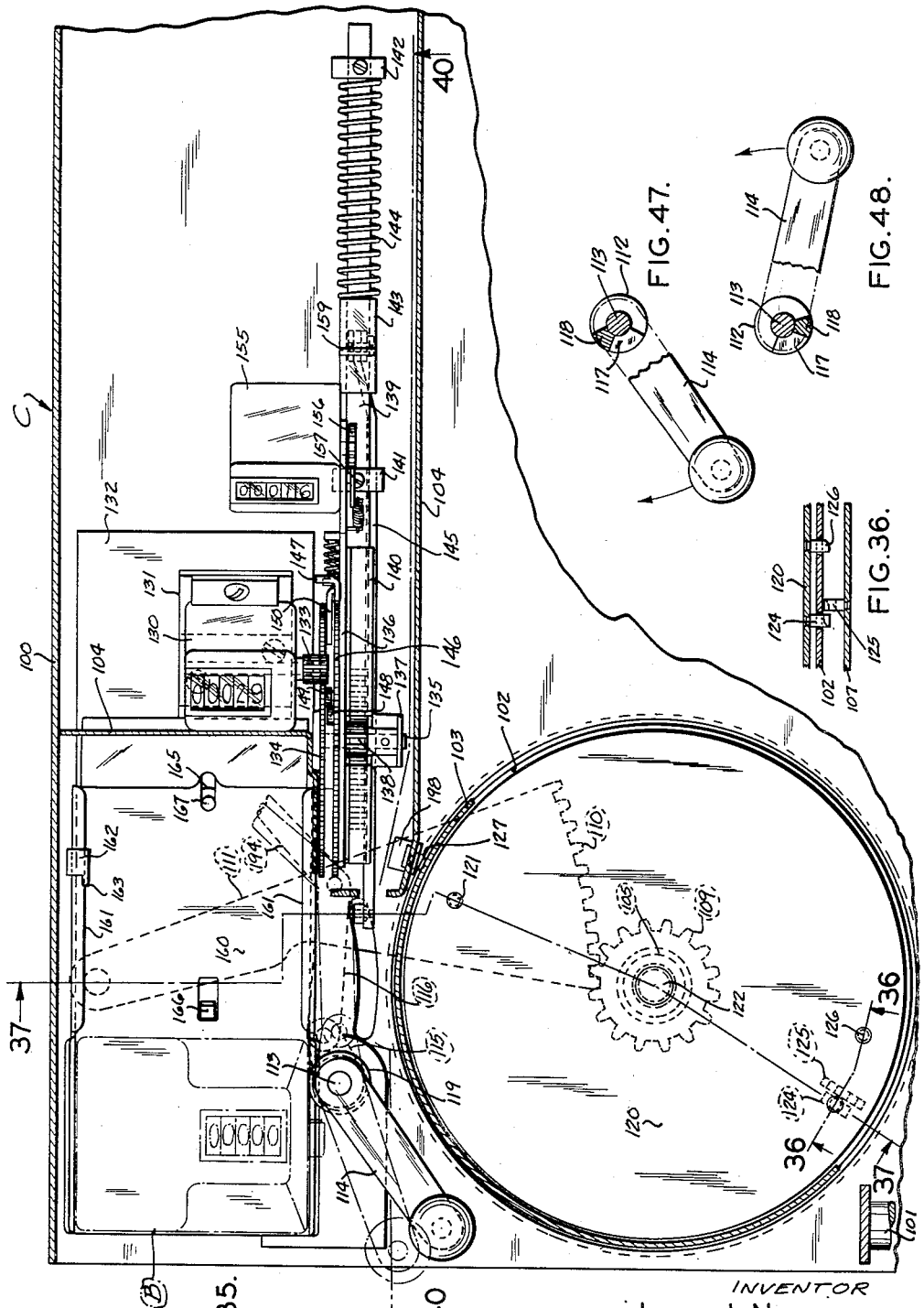
INVENTOR
JOHN J. NOONAN
BY Wells R. Church
ATTORNEY

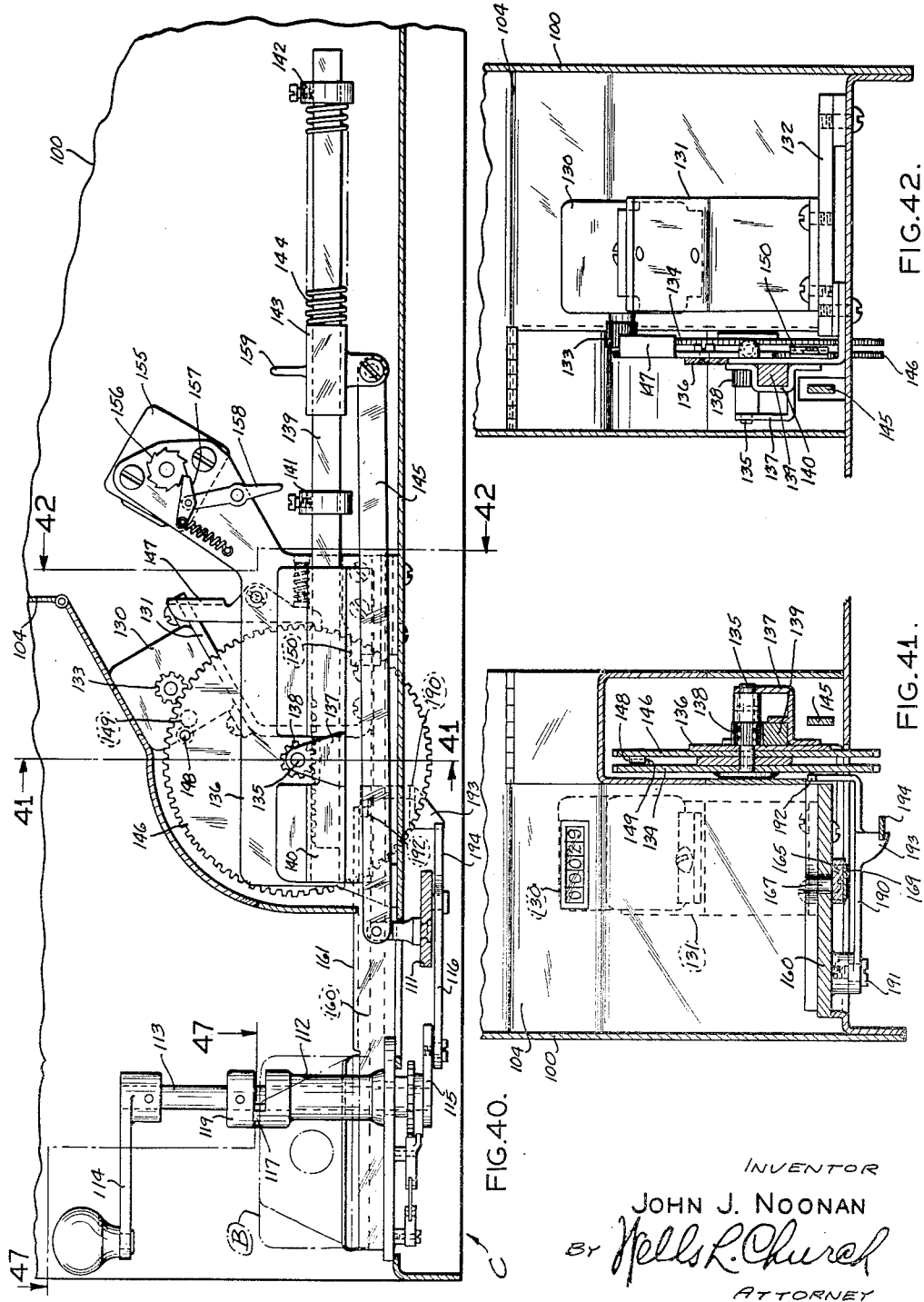

March 20, 1951     J. J. NOONAN     2,545,670
MERCHANDISING APPARATUS
Filed May 13, 1946     15 Sheets-Sheet 10

INVENTOR
JOHN J. NOONAN
By Wells L. Church
ATTORNEY

March 20, 1951 J. J. NOONAN 2,545,670
MERCHANDISING APPARATUS

Filed May 13, 1946 15 Sheets-Sheet 11

INVENTOR
JOHN J. NOONAN
BY Wells L. Church
ATTORNEY

March 20, 1951
J. J. NOONAN
2,545,670
MERCHANDISING APPARATUS
Filed May 13, 1946
15 Sheets-Sheet 12
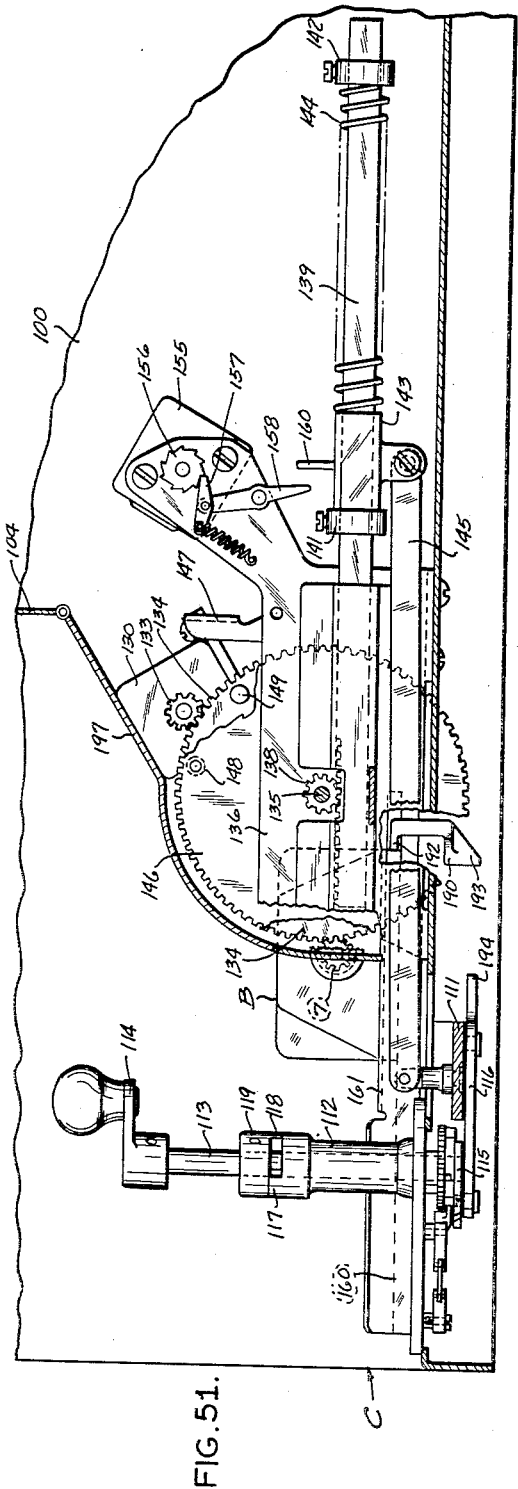
INVENTOR
JOHN J. NOONAN
By Nells L. Church
ATTORNEY INVENTOR
JOHN J. NOONAN
BY Wells R. Church
ATTORNEY March 20, 1951 J. J. NOONAN 2,545,670
MERCHANDISING APPARATUS
Filed May 13, 1946 15 Sheets-Sheet 14
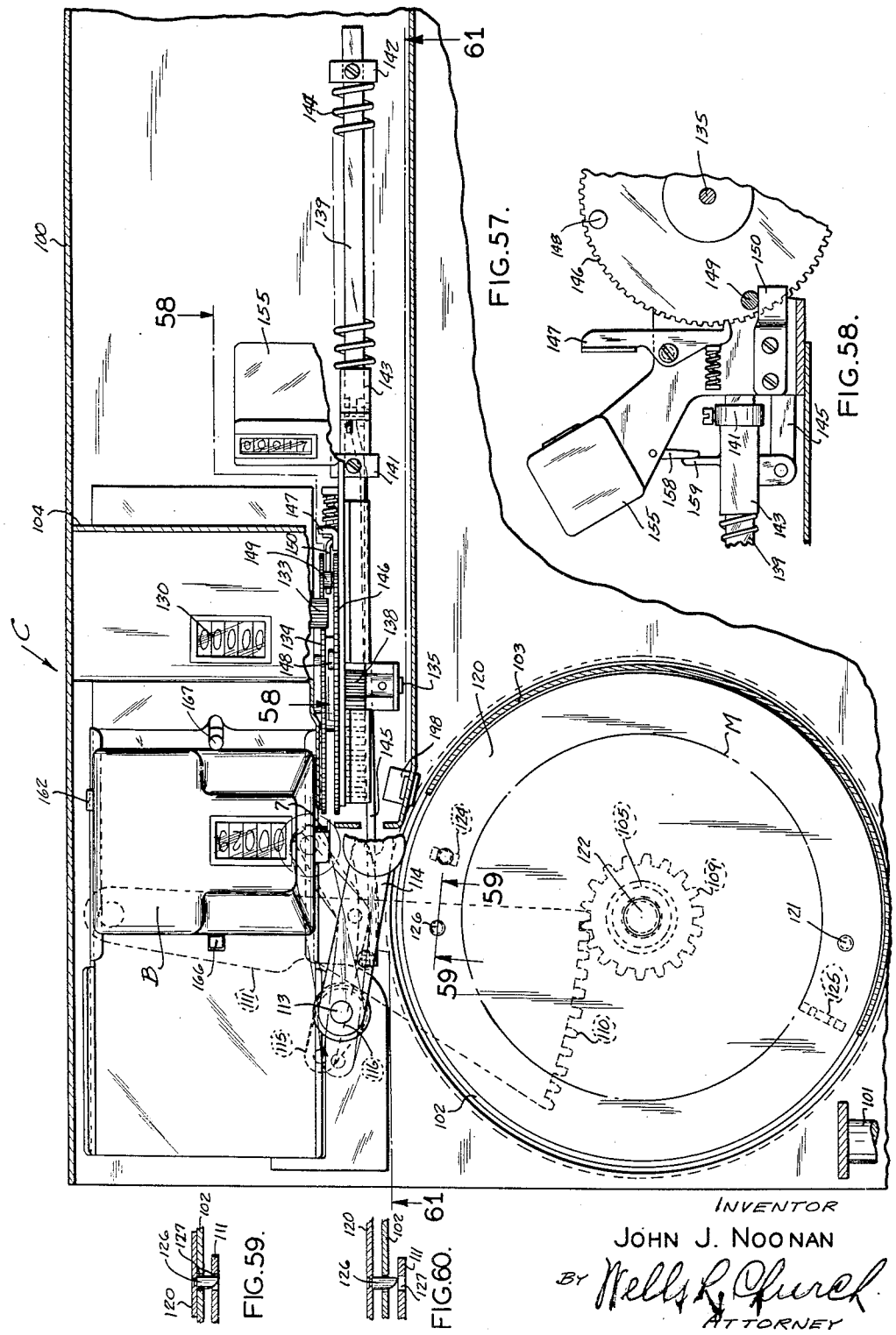
INVENTOR
JOHN J. NOONAN
BY Wells R. Church
ATTORNEY March 20, 1951     J. J. NOONAN     2,545,670
MERCHANDISING APPARATUS Filed May 13, 1946     15 Sheets—Sheet 15

INVENTOR
JOHN J. NOONAN
BY Wells L. Church
ATTORNEY

Patented Mar. 20, 1951

2,545,670

UNITED STATES PATENT OFFICE 2,545,670

MERCHANDISING APPARATUS

John J. Noonan, St. Louis, Mo.

Application May 13, 1946, Serial No. 669,289

5 Claims. (Cl. 235—1)

This invention relates to a merchandising apparatus that is primarily adapted for use in retail stores for dispensing merchandise and automatically calculating the amount which each customer must pay for merchandise which he has selected, and for registering or recording in a totalizer or totalizing mechanism in charge of a store employee, the total of the amounts collected or received from the store's customers during a certain period of time, as, for example, during one day's business.

In one merchandising system that is now used extensively in retail stores, particularly grocery stores of the self-service type, the merchandise is displayed on open shelves or in unlocked compartments, arranged so that any customer can pick up as much merchandise as he desires and then carry same to a check-out counter, at which is stationed a cashier or "checker," whose duty it is to count the articles of merchandise selected by a customer, add the total of the sale price of the respective articles, usually by ringing up the sale price of each article in a conventional cash register, and then receive or collect from the customer an amount of money equal to the number set up in the cash register, which represents the total of the customer's purchases. During this transaction the checker or an assistant packs the selected merchandise in a bag or other container in which the customer carries the merchandise away from the store. In the above merchandising system a dishonest customer can easily secret on his person numerous articles of merchandise, inasmuch as the merchandise offered for sale is displayed in unlocked zones or compartments, and no means is provided for indicating or noting the fact that the customer has picked up and obtained possession of an article of merchandise he does not intend to pay for.

Hence, such a system is open to the objection that the store owner is liable to suffer considerable loss, due to theft of merchandise by dishonest customers. Another loss results to the store owner if the store cashier or checker, either accidentally or through connivance with a dishonest customer, charges the customer for a less number of articles than he has obtained, or charges the customer a lower price than he should have paid for the merchandise he carries away from the store. Another objection to the above mentioned system is that a customer is liable to be charged for a greater number of articles than he receives, or is liable to be charged a price for an article in excess of the sales price, due to the fact that the operation of checking a customer and receiving payment for his purchases is dependent upon the checker correctly remembering or noting from the price mark on each article, the sale price of the article and then properly ringing up the price or registering the price of the article in the store cash register. Still another objection to such a system is the length of time required to count the articles purchased by a customer, ring up the sale price of same in the store cash register, and then pack the articles in a container. In fact, in many instances (particularly during rush hours), the operation of checking out customers not only greatly reduces the volume of business which the store is capable of handling, but also subjects the customers to so much loss of time while standing in line, waiting to make payment to the cashier, that many people will not patronize a store employing such a system, notwithstanding the fact that stores of the self-service type generally sell their merchandise at a lower price than stores of the kind which employ clerks to serve the customers.

One object of my invention is to eliminate loss to a retail store owner, resulting from thefts of customers and thefts and/or mistakes of the store cashier or checker, who receives payment from the customers for their purchases.

Another object is to reduce the time required to collect or receive from the customers of a store, the amounts due the store owner for the customer's purchases, thereby speeding up the throughput of business of the store and eliminating annoyance to the customers, due to standing in line and waiting to make payment for purchased merchandise.

Another object is to eliminate the possibility of the customers of the store from being overcharged for purchases, or for being charged for merchandise which the customer did not obtain.

Another object of my invention is to provide a merchandising apparatus, which, in addition to attaining the objects or results above mentioned, is easy to service, sufficiently inexpensive to make it practicable for use in a retail store that handles packaged merchandise, and of sufficiently simple design and rugged construction to insure its remaining in operative condition, even when subjected to the rough usage which a merchandising apparatus for a retail store is liable to receive.

Another object of my invention is to provide an apparatus for registering or for producing a record of a plurality of individual transactions, that is of rugged design and reliable in operation, inasmuch as co-acting pawls and ratchets are not employed in that part of the mechanism of the apparatus employed to add or produce a total amount which subsequently is transferred into a totalizer.

And still another object of my invention is to provide a novel means for clearing or re-setting a counting device or adding device of the kind in which units wheels are directly connected with each other by co-acting gears that are always in mesh. Other objects and desirable features of my invention will be hereinafter pointed out.

The merchandising apparatus herein described, which constitutes my present invention, comprises or is composed of the following principle elements, devices, mechanisms, or instrumentalities, to wit:

(1) A plurality of normally locked merchandise dispensers, compartments, spaces or zones, which hold and display merchandise that is offered for sale;

(2) A group of customers' control units of identical construction, that the customers of the store employ to obtain possession of articles or merchandise which they desire to purchase, which control units are of such construction that the operation of using a control unit to effect the release or discharge of an article of merchandise from one of the merchandise dispensers, causes the sale price of the selected article to be automatically set up in a register or counter forming part of the customer's control unit; and (3) A store totalizer and re-setting device designed to be operated or rendered operative by the insertion in same of a customer's control unit, and constructed so that during the operation of transferring the amount set up in a customer's control unit, into the store totalizer, the counter or register of the customer's control unit will be reset, cleared, or restored to starting position.

Each customer, upon entering the store, takes possession of one of the above mentioned control units, and subsequently, in going through the store, and selecting the articles which he desires to purchase, the customer uses said control unit to effect the discharge or delivery from the various merchandise dispensers of the articles he has selected. During each of the above operations, i. e., obtaining possession of a selected article, a number representing the sale price of that particular article is set up in the counter or register of the customer's control unit, with the result that when the customer has completed his purchases, his control unit will indicate the amount he must pay the store cashier or checker. During the operation of obtaining possession of selected articles from the merchandise dispensers and having the sale price of the individual articles automatically set up in the counter or register of the customer's control unit, the customer packs his selected articles in a container, such as a paper bag furnished by the store, and at the completion of the operation of selecting the merchandise to be purchased, the customer proceeds to the check-out counter, where he surrenders his control unit to the store cashier or checker and pays the amount represented by the number set up in the counter or register of the control unit. The cashier then inserts the customer's control unit in a space provided for same in the store totalizer and actuates or renders operative a mechanism which causes the number in the control unit representing the total of the customers' purchases, to be transferred to the store totalizer and also re-sets or clears the counter of the customer's control unit.

The above mentioned devices or mechanisms can be constructed in various ways, without departing from the spirit of my invention, but I prefer to construct said mechanisms in the manner herein illustrated and described, due to the fact that they co-act with each other to produce a merchandising apparatus that enables a large volume of merchandise to be sold and delivered to the public by a large number of individual sales or transactions, with no loss to the store owner, due to dishonesty of customers, or due to dishonesty or mistakes on the part of the store employees, and accomplishes the above result without subjecting the customers to the annoyance of waiting a considerable length of time after having selected merchandise for which the customers must pay before leaving the store. Subsequently, I will specifically describe the details of construction and the method of operation of the different mechanisms, devices, or instrumentalities that make up my improved apparatus, but I desire to emphasize at this point some of the desirable features or characteristics of my apparatus, as follows: Customers can easily see and examine the merchandise offered for sale, but it is impossible for a customer to obtain possession of an article for which he will not have to account or pay for, inasmuch as a customer cannot obtain actual possession of an article, without first inserting his control unit in a space provided for same in a merchandise dispenser, which operation or the subsequent delivery of the selected article from the dispenser, results in the sale price of the selected article being set up in the counter of the customer's control unit; the customer's control units and the merchandise dispensers are of such construction that, after a customer starts on the operation of obtaining possession of an article of merchandise, he must complete the operation and actually pick up or remove the selected article before he can regain possession of his control unit; the customer's control units are of such design and size that they can be conveniently held in a customer's hand, and the counter or register of each customer's unit is of such design and construction, that it is normally locked and cannot be manipulated manually, either by the customer or the store cashier, to change the number set up in the control unit to represent the total amount of the customer's purchases; the customer's control unit is provided with a counter or register comprising units wheels or number wheels, which, at all times, are in plain view of the customer, thereby tending to prevent a customer from purchasing merchandise in excess of the amount of money the customer then has in his possession and also enabling a customer to check his cash at the completion of his purchases, and thus perchance, learn that he has sufficient funds left to make additional purchase, if he so desires; and the customer's control unit is provided with a geared type counter or register, which, in addition to being of rugged design, is inexpensive to purchase, easy to service and capable of being built into a customer's control unit, simply by the addition to the same of a few parts of simple design.

Figure 1 of the drawings is a schematic plan view of a store equipped with a merchandizing apparatus embodying my invention, illustrating diagrammatically the component parts of the apparatus.

Figure 3:
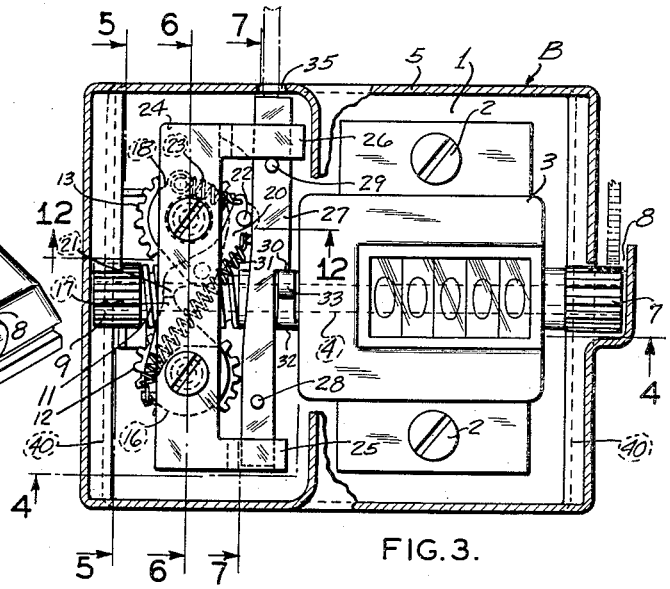
Figure 3 is a plan view of said control unit, with the housing broken away and shown in section.
Figure 5:
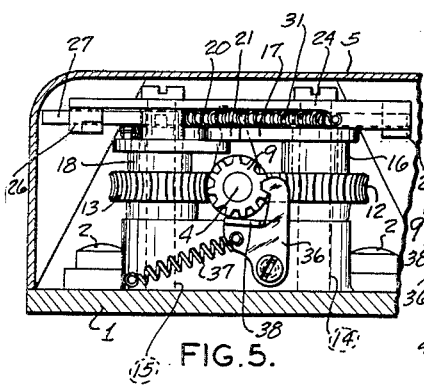
Figure 4:
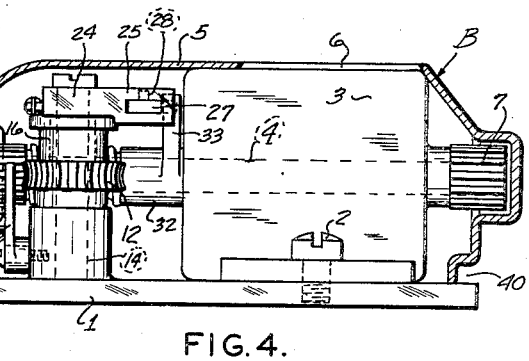
Figure 4 is a vertical longitudinal sectional view, taken approximately on line 4—4 of Figure 3.
Figure 6:
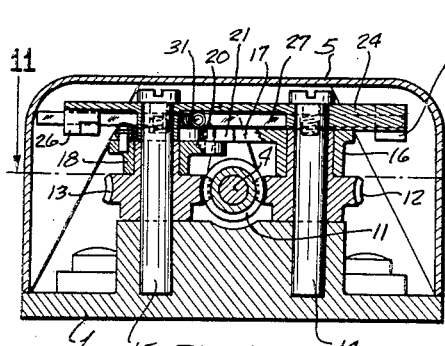
Figure 7:
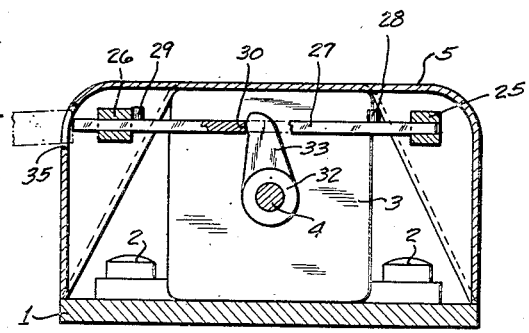

Figures 5, 6 and 7 are vertical transverse sectional views, taken, respectively, on lines 5—5, 6—6, and 7—7 of Figure 3, illustrating the construction and arrangement of parts of the setback controlling means.

Figure 8 is a view similar to Fig. 3, but showing certain parts moved to agree with a different setting of the counter of the customer's control unit.

Figures 9 and 10 are similar views, showing the parts in other positions to agree with still different settings of the counter.

Figure 11 is a fragmentary, horizontal sectional view, taken on line 11—11 of Figure 6, illustrating the worm gear drive.

Figure 12 is a fragmentary, vertical sectional view on line 12—12 of Figure 3.

Figure 13 is a fragmentary end elevation of the customer's control unit, partly broken away and in section, so as to show the counter locking device and the driving gear on one end of the operating shaft.

Figure 14 is a detail sectional view, taken along the line 14—14 of Figure 13.

Figure 15 is an isometric view of the store totalizer or totalizing mechanism, and the motor that forms part of the set-back device, said parts being mounted above a cash drawer.

Figure 16 is a fragmentary isometric view of the accumulator or counter of the store totalizer.

Figure 17 is a plan view of the store totalizer, with portions of the housing broken away and in section, showing the parts in their normal or inactive position.

Figures 18, 19 and 20 are sectional views, taken on the lines 18—18, 19—19 and 20—20 of Figure 17, showing, respectively, the totalizer locking and switch-operating lever, the motor drive locking means and the motor switch.

Figure 21 is a vertical sectional view of the clutch and operating lever locking means, as viewed along line 21—21 of Figure 17.

Figure 22 is a vertical sectional view, illustrating the locking means for the accumulating counter of the store totalizer, said view being taken along line 22—22 of Figure 17.

Figure 23 is a vertical sectional view, showing said counter locking means and taken on line 23—23 of Figure 22.

Figure 24 is a fragmentary plan view similar to Figure 17, but showing the customer's control unit inserted in the store totalizer in position to be set back, and the operating lever depressed to actuate the motor switch.

Figures 25, 26 and 27 are sectional views, taken, respectively, along lines 25—25, 26—26 and 27—27 of Figure 24 similar to Figures 18, 19 and 20, except for the relative change in position of parts.

Figures 28 and 29 are sectional views, illustrating the operation of the locking mechanisms for the counter of the customer's control unit and the counter of the store totalizer, as viewed, respectively, along lines 28—28 and 29—29 of Figure 24.

Figures 30, 31 and 32 are sectional views similar to Figures 25, 26 and 27, but showing the parts in their respective positions at the time the counter of the customer's control unit has been set back to zero, and the operation of the motor has ceased.

Figure 33:
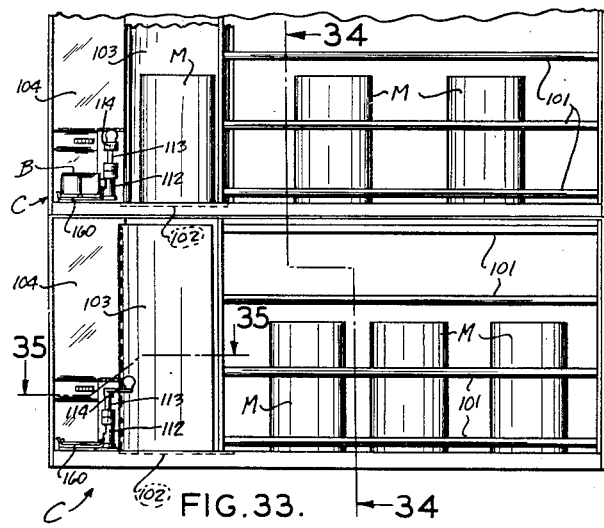

Figure 33 is a front elevation, illustrating two of the locked merchandise compartments or dispensers with the discharge devices in different positions.

Figure 34:
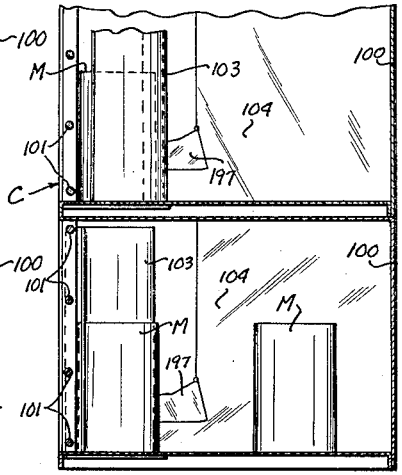

Figure 34 is a vertical section, taken on the line 34—34 of Figure 33.

Figure 35 is an enlarged, fragmentary top plan view, taken on the line 35—35 of Figure 33, for the purpose of illustrating the construction of the turn-table and other co-acting parts of the dispensing mechanism.

Figure 36 is a detailed section of the turn-table locking means, taken on line 36—36 of Figure 35.

Figures 37, 38, 39:
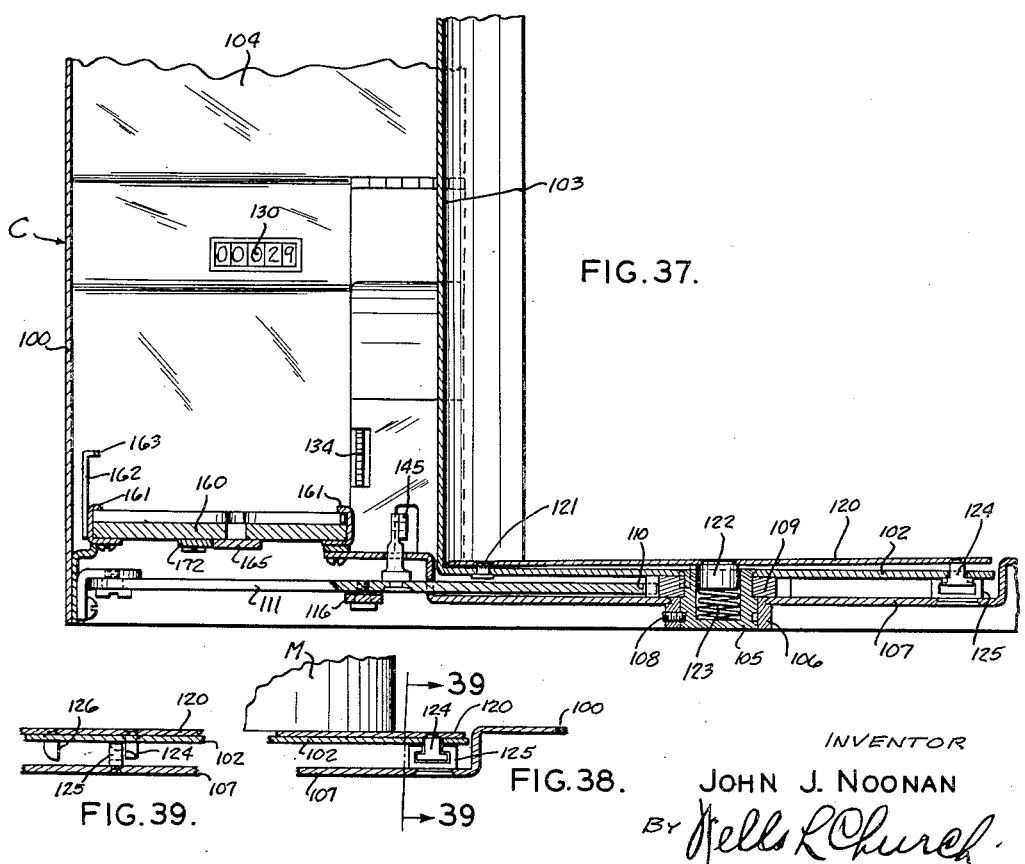

Figure 37 is a vertical section, taken on the line 37—37 of Figure 35.

Figure 38 is a fragmentary vertical section, showing the turn-table locking means in unlocked position.

Figure 39 is a vertical sectional view, thereof, taken on line 39—39 of Figure 38.

Figure 40 is a vertical transverse section of the dispenser operating mechanism, taken on line 40—40 of Figure 35.

Figures 41 and 42 are vertical sections, taken on lines 41—41 and 42—42, respectively, of Figure 40.

Figure 43:
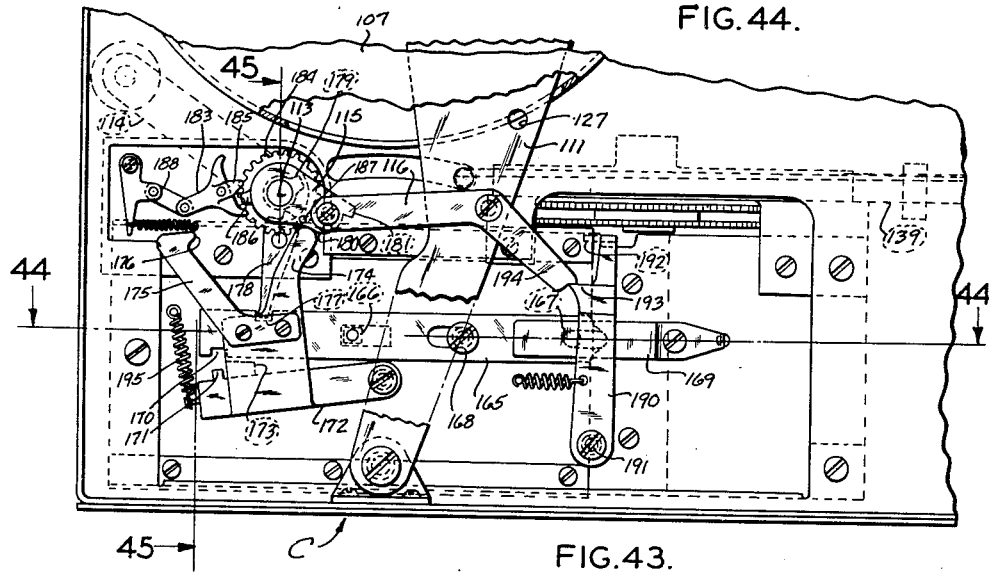

Figure 43 is an inverted plan view of a portion of the dispensing mechanism and locking means.

Figure 44:
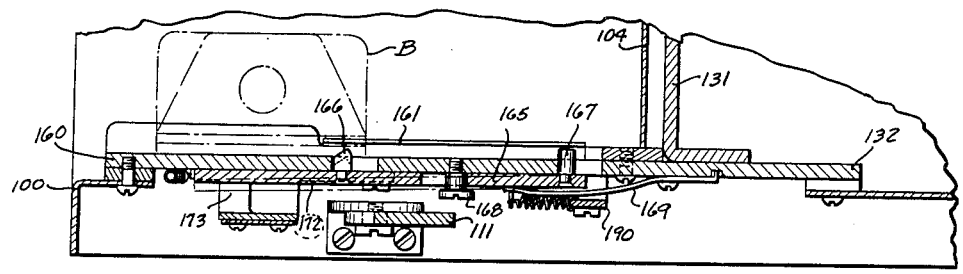

Figure 44 is a longitudinal vertical sectional view, taken on line 44—44 of Figure 43.

Figure 45:
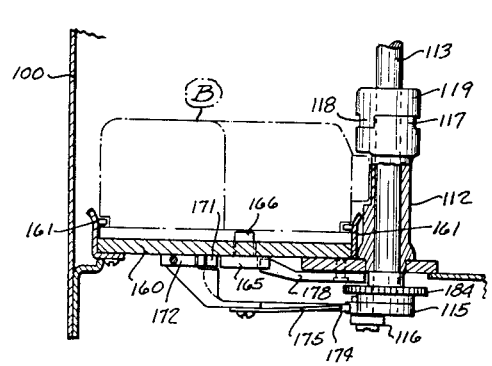

Figure 45 is a cross-sectional view, taken on line 45—45 of Figure 43.

Figure 46:
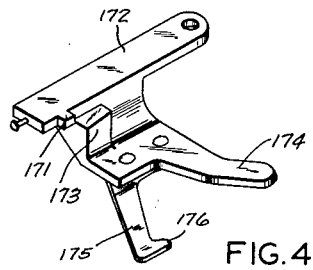

Figure 46 is a perspective view of a locking lever.

Figure 47 is a sectional elevation of the operating handle stop means, taken on line 47—47 of Figure 40.

Figure 48 is a similar view, with the handle moved to its opposite position.

Figures 49, 50:
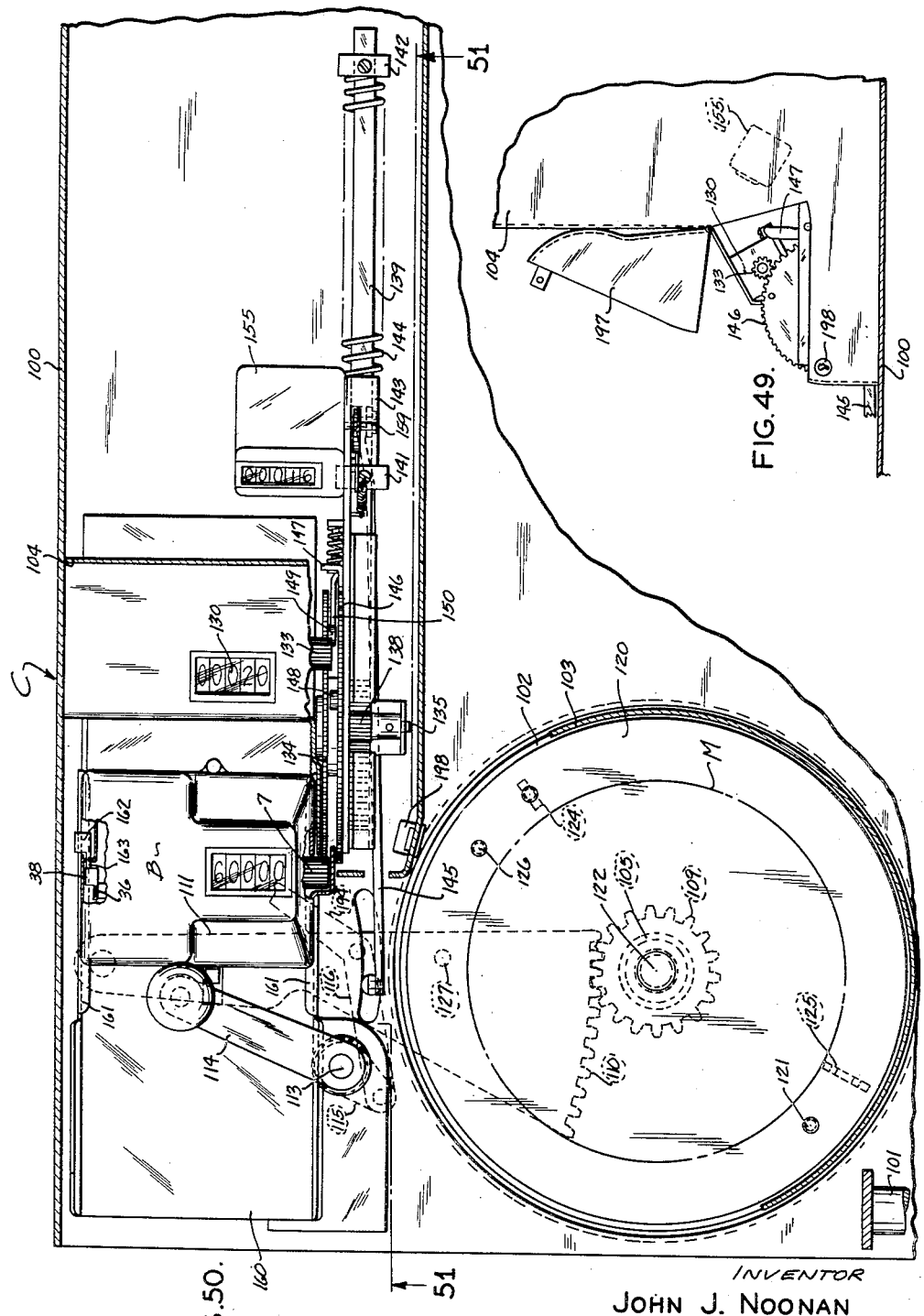

Figure 49 is a reduced side elevation of the housing and access door for the dispensing mechanism.

Figure 50 is a view similar to Figure 35, but showing the customer's control unit locked in place and the mechanism moved to partially transfer the purchase price thereto.

Figure 51 is a vertical sectional view, taken on line 51—51 of Figure 50.

Figure 52:
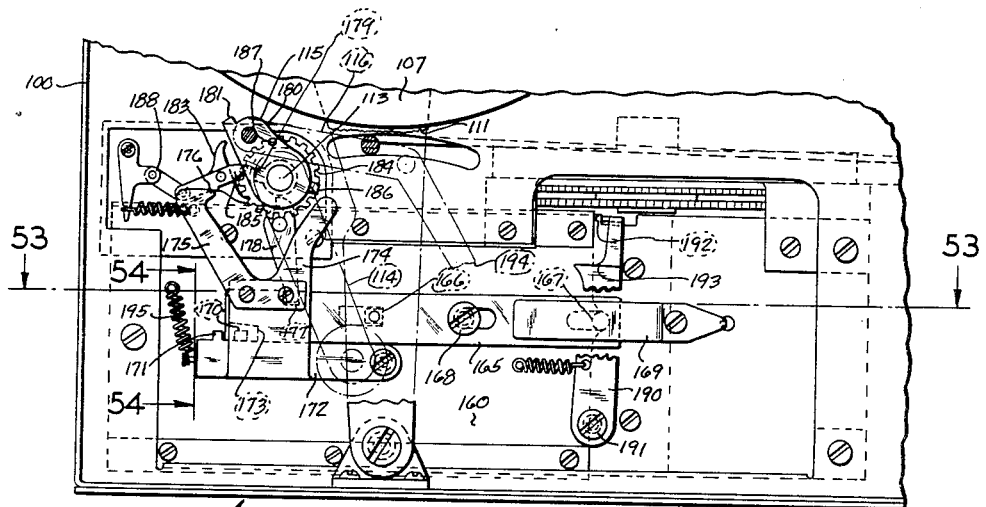

Figure 52 is an inverted plan view similar to Figure 43, but showing the parts moved in accordance with Figure 50.

Figure 53:
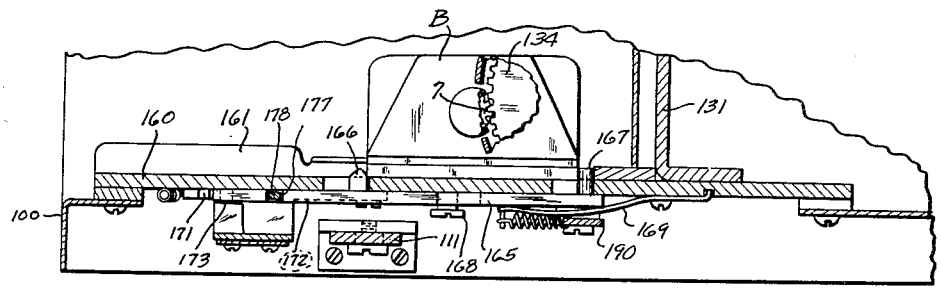

Figure 53 is a longitudinal vertical sectional view, taken on line 53—53 of Figure 52.

Figure 54:
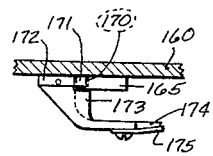

Figure 54 is a detail section of the locking mechanism, taken along line 54—54 of Figure 52.

Figure 55:
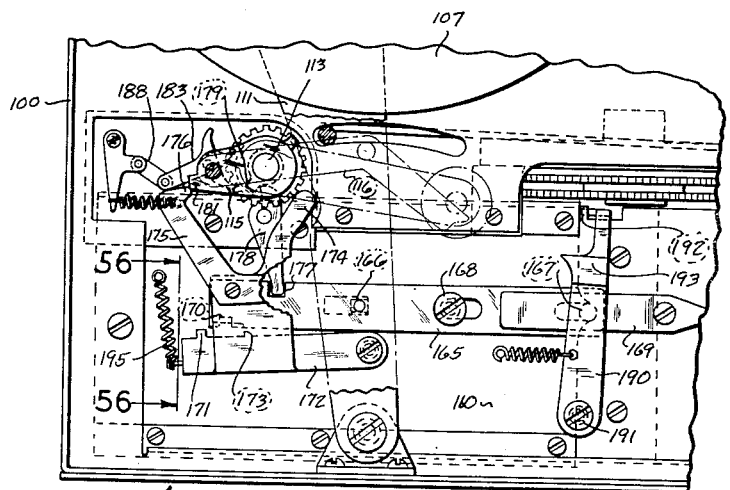

Figure 55 is an inverted plan view similar to Figure 52, but showing the relation of parts at the time of the completion of the price transfer into the counter of the customer's control unit.

Figure 56:
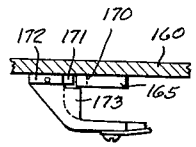

Figure 56 is a detail section, taken on line 56—56 of Figure 55.

Figure 57 is a plan view similar to Figure 35, but showing the parts in the final merchandise dispensing position.

Figure 58 is a fragmentary sectional view of the price setting arrangement as viewed along line 58—58 of Figure 57.

Figure 59 is a detail section of the turn-table locking means, viewed along line 59—59 of Figure 57.

Figure 60 is a similar view, but showing the parts in unlocked position.

Figure 61 is a longitudinal section, taken on line 61—61 of Figure 57.

Figure 62:
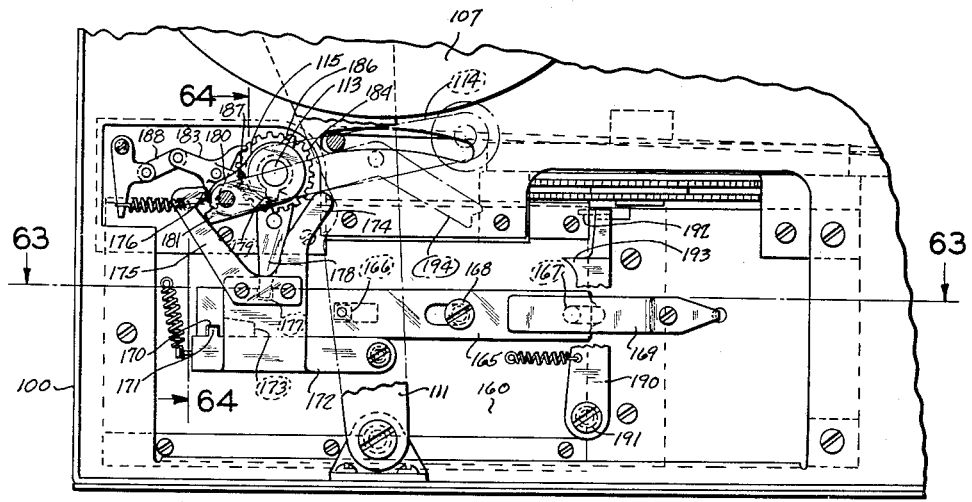

Figure 62 is an inverted plan view similar to Figure 43, but showing the parts in the position corresponding to that shown in Figure 57.

Figure 63:
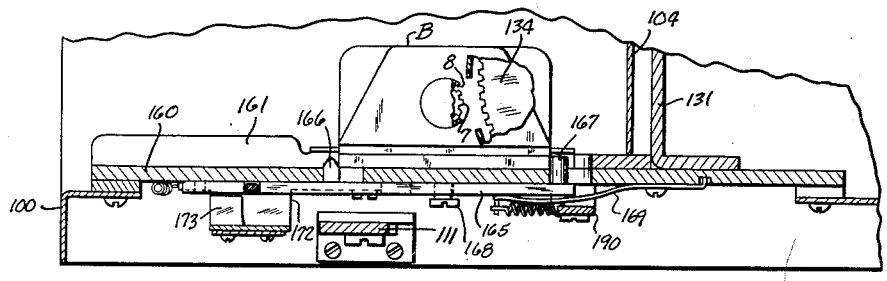
Figure 64:
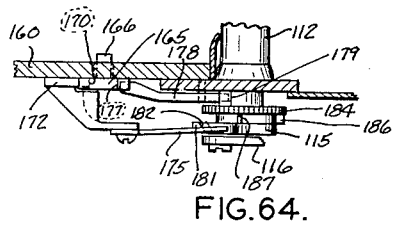

Figure 63 is a longitudinal vertical sectional view, taken on line 63—63 of Figure 62, and Figure 64 is a cross-sectional view, taken on line 64—64 of Figure 62.

Figure 1:
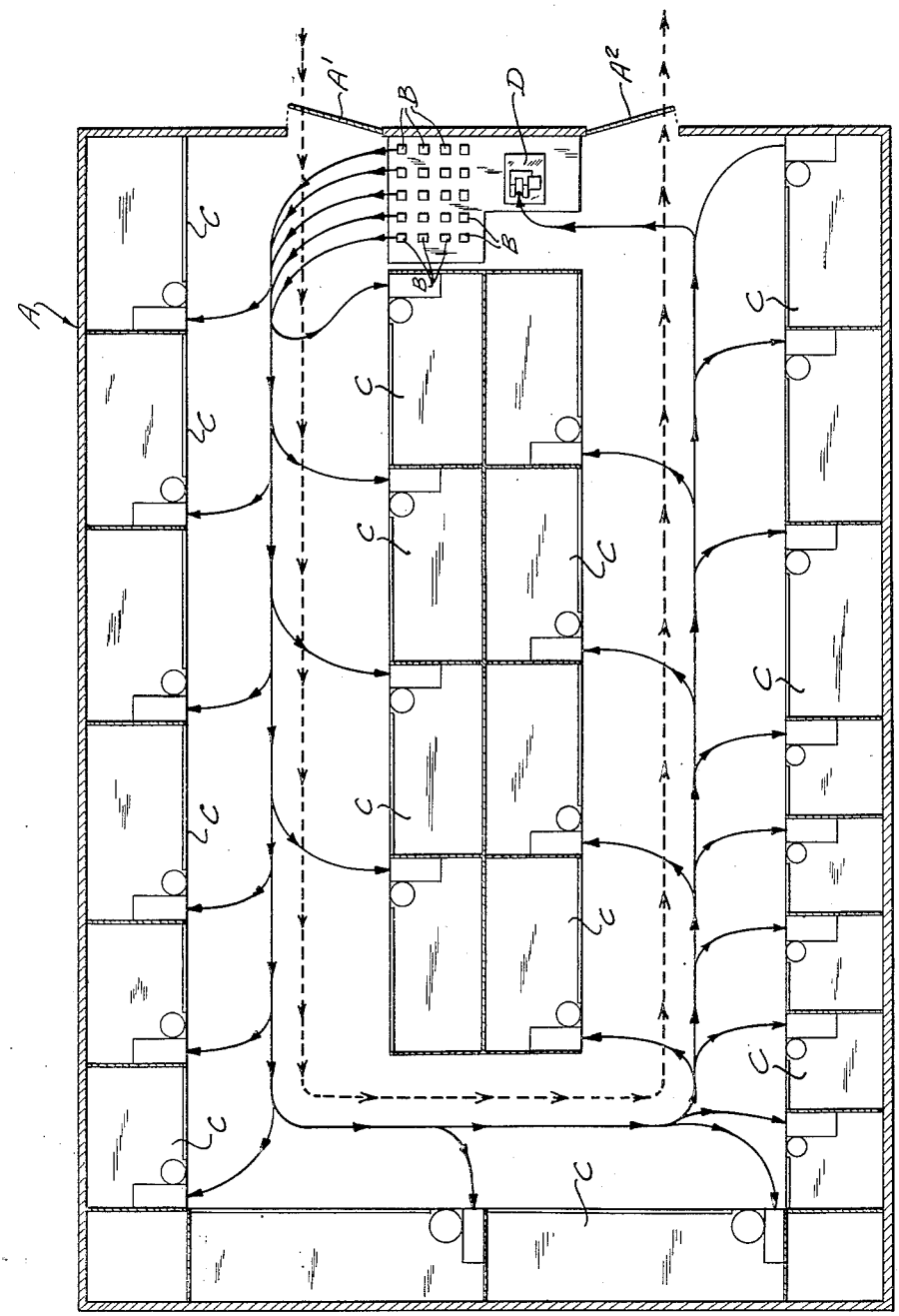

In the accompanying drawings, which illustrate a merchandising apparatus constructed in accordance with my invention, the reference character A in Figure 1 designates a retail store of the self-service type, for example, a grocery store, provided with an entrance door A', and an exit door A². Near said entrance door is a table or other supporting structure on which are arranged a plurality of customer's control units B (one for each customer) which are intended to be used by the customers to obtain possession of merchandise displayed for sale in a plurality of locked merchandise compartments or dispensers C, and also used by the store cashier or checker to record or register the total of all of the customer's purchases, during a certain period of time, in a store totalizer and resetting device D, that is arranged adjacent the exit door A² of the store. Upon entering the store a customer receives one of the control units B. He then proceeds to a merchandise dispenser C, inserts his control unit B into a slide in the dispenser, and thereafter, upon actuation of an operating handle, one of the articles in said dispenser will either automatically be ejected from the dispenser, or arranged in such a position that the customer can gain possession of the article. In the particular form of my invention herein illustrated, it is necessary for the customer to pick up the selected article and place it on a delivery device or discharge device, but I wish it to be understood that my invention contemplates the use of merchandise dispensers of such construction that the insertion of the customer's control unit in a dispenser containing an article the customer desires to purchase, will automatically effect the discharge of the selected article, and, of course, also cause the price of that article to be set up in the register or counter of the customer's control unit. In the particular apparatus herein illustrated actuation of the operating handle, above mentioned, will cause the price of the selected article to be set up in the counter of the customer's control unit, during the operation of manually moving a delivery device on which the article has been positioned. Upon completion of his shopping, the customer presents his control unit to the cashier, who notes the total amount of the articles purchased and then receives the price of same from the customer, thus checking out the customer and permitting the customer to leave the store. Thereafter, the cashier inserts the customer's control unit into the store totalizer and re-setting device D, and actuates a mechanism which automatically restores the counter or register of the customer's control unit to zero, and transfers the amount previously set up in the counter of the customer's control unit into a mechanism (the device D) whose function is to add or total the purchases made by all of the customers of the store, and register or produce a record of same.

Customer's control unit

Figure 2:
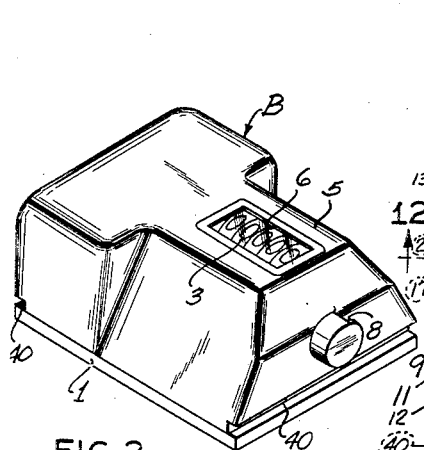
Figure 2 is an isometric view of the customer's control unit.

The customer's control unit, shown in Figures 2 through 14, is virtually a small portable adding device that can be conveniently held in a person's hand. It is of such construction that it is particularly adapted for use, not only in a merchandising apparatus of the kind herein illustrated, but also in any type or kind of apparatus that contemplates the use of or which employs a totalizer and an adding device, normally disconnected from each other, and constructed so that after a number representing a total amount has been set up in the counter or register of said adding device, as a result of actuating said device a plurality of times so as to add several numbers together, said adding device can be arranged in operative engagement with said totalizer, and thereafter operated or actuated in such a way that the amount set up in the adding device will be transferred into the totalizer, and the register or counter of the adding device will be automatically cleared or restored to its starting position. As shown in the drawings, the customer's control unit B comprises a base 1, to which a geared type counter 3 is attached, as, for example, by means of screws 2, said counter having an operating shaft 4 extending outwardly from each end face thereof. In this type of counter rotation of the shaft 4 in one direction will add units into the counter 3 at the rate of 10 units per revolution of the shaft 4, said units being accumulated by units wheels or discs, so as to produce a number or amount. Rotation of the shaft 4 in the opposite direction will subtract units from the counter 3 in a similar way. A housing 5 that encloses the counter 3 and other mechanism, has an opening 6 in the top wall thereof, so as to expose to view the units wheels or discs of the counter, as shown in Figure 2. Secured to one end of the operating shaft is a small gear 7 having a portion of its teeth exposed through a slot 8 in the housing 5, said gear being adapted to be engaged by a driving member, as hereinafter described. Secured to the opposite end of the shaft 4 is a similar gear 9, also exposed through an opening in said housing, the gear 9 constituting a driving member, as hereinafter described.

The number set up in the counter 3 of the customer's control unit is transferred into the store totalizer D by inserting said unit in a space provided for same in the totalizer, and thereafter clearing or re-setting the counter 3 of the customer's control unit. I have devised a novel mechanism for stopping, determining or controlling the starting position of the units wheels of the counter 3 of the customer's control unit during the operation of re-setting said counter. Said mechanism is of the following construction: Fixed to the shaft 4 adjacent gear 9, is a worm 11 that is adapted to drive two worm gears 12 and 13, mounted for rotation on vertical shafts 14 and 15, fixed in a boss portion of the base plate 1 (Figure 6). Mounted on a hub portion of worm gear 12 for rotation therewith, is a collar 16 having a lateral extension 17. Similarly mounted on a hub extension of gear 13 is a flanged collar 18 which carries an upstanding pin 19 for pivotally receiving a lever 20. One end 21 of this lever extends outwardly for selective engagement with extension 17. The opposite end of lever 20 is provided with an upstanding pin 22 and is normally urged towards the shaft 15 by a tension spring 23. Fixed to the upper ends of shafts 14 and 15 is a guide bar 24 having slotted end extensions 25 and 26 for slidably receiving a slide bar 27 whose position controls the stopping of a motor or other operating device that rotates the shaft 4 of the customer's control unit in a direction to re-set the counter 3. The slide bar 27 is provided with upstanding stop pins 28 and 29 and is relieved near its center to form a shoulder 30. A tension spring 31 urges the bar rearwardly to a limit defined by contact of pin 28 with extension 25, and laterally as restricted by the extent of the slot in portion 26 (Figure 8).

It will be noted that in this position of parts the slide bar 27 lies against pin 22 on lever 20. Fixed to the operating shaft 4 between worm 11 and adjacent counter wall, is a hub 32 having an extending arm 33. Normal rotation of this arm with the shaft 4 will clear the portion of the slide bar adjacent shoulder 30, as shown in Figure 9.

The above described worm-gear-driven extensions and slide bar mechanism is so arranged that it will become operative only as the units wheels in the counter 3 approach zero. This is accomplished by providing a differential toothed condition of the gears 12 and 13. In the present example, gear 12 is provided with twenty-three teeth, while gear 14 has twenty-four teeth, which will cause a differential angular relation between extension 17 and lever extension 21, upon successive revolutions of these gears. Considering six units to be set up in the counter 3 of the customer's control unit, as indicated in Figure 8, the outer ends of extensions 17 and 21 will be at the point of contact. Further units accumulated in said counter will cause these extensions to move away from each other, and due to the high gear reduction between worm and worm gears, said extensions will not come into closely-spaced relationship until approximately two hundred forty units have been accumulated in the counter 3, as shown in Figure 9. Since there is a one tooth difference between gears 12 and 13, there will be an angular variation of one tooth therebetween. Therefore, extensions 17 and 21 will not meet and no movement of lever 20 will result. Continued accumulation of units in the counter 3 will merely widen the angular difference between these extensions, as will be apparent from Figure 10, which illustrates the condition of the co-acting parts when four hundred eighty units have been accumulated in the counter. In operating the shaft 4 in the reverse direction, to set back the counter, clear it, or remove the units from the counter, the same conditions will prevail until six units remain in the counter. Further rotation of the operating shaft 4 will cause contact of extensions 17 and 21, which will result in angular displacement of the lever 20 relative to the collar 18 against the force of spring 23. This movement of parts will cause pin 22 to force the slide bar 27 laterally towards the counter 3 to a position shown in broken lines in Figure 8. With the slide bar in this position, the shoulder 30 thereof will now be in the path of arm 33, and as the last unit is removed from the counter 3, such arm will contact the shoulder, and thereafter move the slide bar longitudinally until stopped by contact of stop pin 29 with bar extension 26, as shown in Figure 3. This longitudinal movement of the slide bar is utilized to arrest movement of a controlling means for a clearing mechanism or set-back drive mechanism, later described. An opening 35 is provided in the casing 5 adjacent the slide bar end, for insertion of a suitable portion of the controlling mechanism. It will be apparent that when the counter 3 is cleared or restored to zero, the above described parts will reverse their direction of movement.

Normally, the counter or register 3 of the customer's control unit is locked by a pivotally mounted locking lever 36 having an offset upper end which normally projects into a selected tooth of gear 9 and prevent rotation thereof, a spring 37 being provided to maintain such locking condition, as shown in Figure 13. A flange 38 on lever 36 projects laterally into alignment with an opening 39 in the casing 5, so that access may be had thereto for releasing the locking lever. This lever prevents the operating shaft 4 of the customer's control unit from being rotated to change the condition of the counter 3, when said unit is not arranged in operative engagement with either one of the merchandise dispensers C, or with the totalizer and set-back device D. The housing 5 at each of its end faces, is formed to provide grooves 40 for slidably engaging flanges of guide slides on associated devices. It will be noted from Figure 2, that the housing 5 is formed to closely follow the mechanism on the interior of same, so that the overall form and size of the customer's control unit will comfortably fit a customer's hand.

Store totalizer and re-setting device

The store totalizer and re-setting device D, illustrated in Figures 15 through 32, comprises a supporting plate 45 secured by screw and spacer assemblies 46 to the upper wall 47 of a cash drawer housing 48, or other suitable supporting structure. Also secured to the wall 47 adjacent plate 45 is an electric motor 49 having a shaft extension 50, to which is pinned a cup member 51 (Figure 21). Rotatably mounted on the shaft extension and retained thereon by screw 52, is a clutch collar 53 having spring-pressed shoes 54 frictionally engaging the inner face of cup 51. The outer end of collar 53 is toothed to form a gear 55, which is positioned to yieldingly drive the gear 7 of the customer's control unit B upon insertion of said unit and energization of the motor. Secured to the upper face of plate 45 are guide tracks 56, formed and positioned to slidably receive the groove 40 of the unit B, as shown in Figure 24, a plate 57 providing a stop to finally position said unit. Positioned rearwardly of the plate 45, is a shaft 58 rotatably mounted in bearing brackets 59 and supporting a mercoid switch 60 at one end thereof for controlling the motor 49. Fixed to the shaft near the opposite end thereof, is a lever 61, to one end of which is pivoted a stop bar 62 guidingly supported in a boss 63. The outer end of the stop bar extends forwardly to be received at certain conditions of operation, through opening 35 in the housing 5 of the customer's control unit B, upon insertion of said unit into the device D, as shown in Figure 25. To the opposite end of lever 61 is pivotally secured one portion 64 of a compressible link 65. Pivotally mounted on pin 66 is a locking lever 67, having an arcuate extension 68 movable through an opening 69 in the plate 45. The opposite end of this lever is provided with a button 70 for manual actuation, and a downwardly-extending portion pivotally receives a portion 71 of link 65. An extension spring 72, fixed to lever 67 and pin 73, is positioned to create a toggle action and maintain the lever in either locked or unlocked position. The compressible link 65, comprising the slidably connected portions 64 and 71, is normally maintained in its extended position by spring 74, but under certain conditions, later described, limited rotation of shaft 58 may be effected without disturbing the locked position of lever 67. Pivotally mounted on the under face of plate 45, is a bell crank locking lever 77 having one end extending into the path of locking lever end 68, so as to engage a shoulder 78 thereon when the lever 67 is in the unlocked position shown in Figures 17 and 18, such locking condition of lever 77 being maintained by spring 79. The opposite end of lever 77 is provided with an upstanding pin 80, projecting through a suitable slot in plate 45 and into the path of base 1 of the customer's control unit B, so that upon insertion of the unit B, the lever 77 will be rotated clockwise to remove the lever end from shoulder 78, thus allowing locking lever 67 to be manually moved to locked position.

Fixedly positioned on the shaft 58, between lever 61 and switch 60, is an arm 81 (Figure 19), pivotally and slidably receiving on its outer end a slotted end portion 82 of a lock rod 83 that is slidably mounted in boss 84. The outer end of rod 83 is reduced to fit into the individual teeth of motor gear 55. A spring 85 in the slotted end 82 provides a resilient connection between arm 81 and rod 83 for a purpose later appearing.

Secured to the plate 45 opposite from motor 49, is a counter or register counter 87, having secured to its shaft extension, a drive gear 88 and locking gear 89. This counter is identical to the counter 3 in the customer's control unit B, and is adapted to be driven by the shaft 4 of said unit through the gear 9 and gear 88, upon insertion of the unit B into the totalizer and resetting device D and operation of motor 49. A bell crank lever 90 is pivoted at 91 and urged by spring 92 into locking engagement with gear 89 (Figure 23). This lever also carries a projecting pin 93 positioned to lie in the path of the base 1 of unit B, so that the final movement of said unit into operative position, will cause gear unlocking movement of lever 90 (Figure 29). The above described levers, gears and other mechanism are suitably enclosed by casing 94, provided with openings for access to drive gear 55 and counter gear 88, and an additional opening above counter 87 for exposing the units wheels of counter 87. A pin 95 projects forwardly from the casing portion below gear 88, and aligns with the opening 39 in the housing 5 of the customer's control unit to contact flange 38 of locking arm 36 to move said arm, and thus release the shaft 4 for rotation (Figure 28).

In the normal inactive position of parts, as shown in Figures 15 through 23, the locking lever 67 is maintained in its unlocked position by spring 72, so that lever end 68 lies below the upper surface of plate 45 and is positively prevented from movement by engagement of bell crank 77 with shoulder 78. With this position of the locking lever, shaft 58 is angularly disposed to bring rod 83 into locking engagement with gear 55 and mercoid switch 60 is tilted to circuit-open position. The counter 87 of the totalizer is retained in locked condition by lever 90, as shown in Figure 23.

Upon insertion of the customer's control unit B into the slides 56 and against stop 57, lever 90 is moved out of engagement with counter lock gear 89 (Figure 29) at the same time that gear 88 of counter 87 and gear 9 of counter 3 become enmeshed. The gear 9 of the customer's control unit is released for rotation by movement of locking arm 36, due to the insertion of pin 95, through register cover opening 39 (Figure 28). At the opposite side of the control unit B, gear 7 will engage motor drive gear 55, and locking bell crank 77 will be rotated away from shoulder 78 by contact of the register base plate with pin 80 to release lock arm 67 for manual locking movement to the position shown in Figure 25. Such movement of the locking arm will cause rotation of shaft 58 through link 65, which will move stop bar 62 into housing 5 (Figure 25), remove locking rod 83 from engagement with gear 55 (Figure 26), and tilt switch 60 into circuit closing position (Figure 27). Operation of the motor now energized, will drive the operating shaft 4 of unit B in a direction to set back or remove units from counter 3, and through gear connection 9—88, will transfer these units into the counter 87 of the store totalizer D. This setback operation will continue until the counter of the customer's control unit approaches zero, at which point the slide bar 27 of unit B will be moved outwardly against stop bar 62 to rotate shaft 58 against the force of spring 74 of the compressible link 65 (Figure 30). Such shaft rotation will tilt switch 60 to circuit-opening position (Figure 32) and again insert stop rod 83 into locking engagement with motor gear 55 (Figure 31). Any tendency of the motor 49 to overrun after the counter of the customer's control unit has reached zero, will be absorbed by slippage of clutch elements 51 and 53. Control unit B may now be removed by angular movement of lock lever 67, which removal will again lock the gear 9 of control unit B, the counter gear 88 of the store totalizer D and the locking lever 67.

Merchandise dispensers

The merchandise dispensers C are all of the same construction and are shown in Figures 33 through 64. Each of said dispensers comprises an open-faced box 100 having a portion of the open face protected by horizontal bars 101, so spaced that articles of merchandise M contained within the box cannot be withdrawn through the bars, yet a customer's hand and arm may be inserted therethrough to reach the merchandise. Near one end the box 100 and immediately adjacent the end of bars 101, is a turntable 102 having an upstanding arcuate wall 103, proportioned so as to substantially close the space between bar ends and a price mechanism housing 104. The turn-table has a downwardly projecting, hollow shaft 105, rotatably mounted in a bearing 106, carried by a depressed portion of the box bottom wall 107. A set screw 108 operating in a groove in shaft 105 prevents removal of the turn-table. Fixed to the shaft 105 is a gear 109, adapted to be engaged by the toothed portion 110 of a pivoted operating arm 111. Mounted for rotation in an upstanding boss 112, is a shaft 113 having a manually-operable handle 114, secured to its upper end. Fixed to the lower end of shaft 113 is a crank arm 115 operatively connected to arm 111 by a link 116. A projecting portion 117 on boss 112 co-operates with a corresponding projection 118 of shaft collar 119 to limit the rotation of shaft 113 and arm 114 to the extremes shown in Figures 47 and 48. It will be seen from Figure 35 that the arcuate wall 103 of turn-table 102 is normally positioned so that an article of merchandise may be placed upon the turn-table from the interior of box 100. Under certain conditions, later described, movement of handle 114 will rotate the turn-table, through arm 115, link 116 and arm 111, from the position shown in Figure 35, to that shown in Figure 57, so that the article of merchandise M will be exposed for removal from the turn-table and box. Reverse movement of handle 114 will return the table 102 to its original position. To prevent operation of the turn-table before an article of merchandise has been placed thereon, there is provided a plate 120 overlying the turn-table and fixed thereto by a loose rivet 121 and a downwardly-projecting stub shaft 122 seated in the hollow shaft 105 and normally urged upwardly by a spring 123. Fixed to the plate 120 opposite rivet 121, is a depending T-shaped stop pin 124 projecting through an opening in turn-table 102 and into the path of a T-slotted fitting 125, fixed to the box wall 107. When there is no article of merchandise on the plate 120, the spring 123 will urge the plate upwardly, so that the pin 124 and fitting 125 will be out of alignment, as shown in Figures 36 and 37, thus preventing rotation of the turn-table. When an article of merchandise is placed on the plate 120, the plate will be depressed and the mating portions of pin 124 and fitting 125 will be aligned, as shown in Figures 38 and 39, so that relative movement of the parts may take place. A second depending pin 126 of plate 120 is positioned to align with and become seated in a mating opening 127 in arm 11, upon rotation of the turn-table to merchandise exposing position (Figures 57 and 59). Locking engagement of the pin will prevent return movement of the turntable until the article of merchandise M has been removed therefrom to release the pin from opening 127, as shown in Figure 60. The purpose and value of the two above described locking features will become apparent from the use and operation of the mechanism, later described.

A merchandise price counter 130, identical to counter 3 of the customer's control unit B, is mounted upon a bracket 131 supported on a portion 132 of the box floor, and carries a gear 133 on its shaft extension. Meshing with gear 133 is a much larger gear 134, fixed to a shaft 135, supported in a mounting plate 136 and a bracket 137, the mounting plate being suitably secured to floor 107 (Figure 41). Fixed to the shaft 135 is a small pinion 138, adapted to mesh with the tooth portion of a rack bar 139, slidably carried by a channel plate 140. The rack bar 139 extends rearwardly and has secured thereto set collars 141 and 142. Slidably mounted on the rack bar 139, between these collars, is a sleeve member 143; also surrounding the bar 139 between sleeve 143 and collar 142 is a compression spring 144. The sleeve 143 is connected to the arm 111 by a link 145, so that angular motion of the arm 111 will produce sliding movement of the sleeve on the bar 139, and under certain conditions, will produce movement of the bar 139.

Rotatably mounted on shaft 135 is a serrated disc 146 normally held against rotation by a spring-pressed detent lever 147. Fixed to the disc 146 and extending axially towards gear 134 is a pin 148, which is radially aligned with, and under certain conditions, abuts a corresponding pin 149 fixed to gear 134. Extending between the gear 134 and disc 146, in the path of pin 149, is a stationary stop bar 150 (Figure 58). When the gear 134 is positioned so that pin 149 is in contact with stop 150, the counter 130 is set at zero (Figures 57 and 61); any movement of the gear counterclockwise (Figure 40), sets up units in the counter, until such movement is terminated by contact of pins 148 and 149. As shown in Figures 35, 37, 40 and 41, there are twenty-nine units set up in the counter; this indicates that the price of the merchandise contained in the dispenser box is twenty-nine cents (29¢). Other prices may be set up in the counter by manually releasing the detent lever 147 and manually moving the gear 134 and disc 146 with pins 148 and 149 in abutting position, until the desired price appears in the counter window. The normal position of parts is shown in Figures 35 and 40, in which the sleeve 143 is moved to the right away from collar 141 and compressing spring 144 to tend to move the bar 139 to the right, which, in turn, tends to rotate gear 134 to assure contact of pin 149 with pin 148. The space relation of sleeve 143 and collar 141 is determined by the price setting of counter 130 and ultimate position of pin 148. Operation of handle 114 to actuate the turn-table through arm 11, also moves sleeve 143 to the left. No movement of bar 139 will take place until the sleeve abuts collar 141; and thereafter continued movement will cause sliding movement of bar 139 and clockwise rotation of gear 134, until pin 149 strikes top bar 150. This rotation of gear 134 removes the units from the counter 130 and is utilized to drive the counter 3 of the customer's control unit B and accumulate these units in the control unit, as later described. Return movement of handle 114 again moves sleeve 143 to the right against spring 144 and collar 142, and rotates gear 134 in a counterclockwise direction to again set up price units in counter 130, the spring allowing continued movement of sleeve 143 after contact of pins 148 and 149, to compensate for varying price settings and location of pin 148.

Preferably, a means is provided for producing a record of the number of individual articles of merchandise removed from the dispenser, said means comprising counter 155 secured to a portion of plate 136. Fixed to the counter shaft is a ratchet wheel 156, operated by a spring-pressed pawl arrangement 157, including a depending lever 158. An upstanding lip 159 on sleeve 143 contacts the lever 158 at each operation of the dispensing mechanism and sets up one unit in counter 55 (Figures 40 and 61). Forwardly of counter 130 and adjacent turn-table 102, is a slide plate 160, provided with lateral guides 161 for guidingly receiving the customer's control unit B (Figures 50 and 51), which, in its initial inserted position, provides engagement of gear 7 of the control unit with gear 134. An upstanding bracket 162, secured to one guide 161, is formed with a forwardly-extending pin portion 163, which projects through the opening 39 in housing 5 of the control unit B, to engage and release the gear locking lever 36 upon insertion of unit B.

As a means for locking the control unit B in operative engagement with gear 134 during the price accumulating movement of the mechanism and partially removing said unit therefrom at a predetermined time, there is provided a slide bar 165 beneath the slide table 160 (Figures 43 and 44). This slide bar 165 is provided with upstanding pins 166 and 167, which project through suitable slots in the slide plate 160, and is slotted to receive a shouldered screw 168. The slide bar 165 is held resiliently against the under surface of slide plate 160 by a flat spring 169. The forward end of the bar 165 is provided with a lateral notch 170 adapted to selectively receive a projecting tab 171 on a pivoted locking lever 172, such locking lever having an underlying projecting portion 173 adapted to prevent downward movement of the bar 165 at predetermined positions of the parts (Figures 43 and 46). The lever 172 is formed to provide a depending and lateral extension 174, and carries a flat spring 175 provided at its outer end with a cam-engaging nose portion 176. On the edge opposite notch 170, the bar 165 is formed with a notch 177 adapted to receive one end of a lever 178, the opposite end of which is adapted to be engaged by a lug 179 formed on the lower portion of shaft 113. On one edge of the crank arm 115 is formed a cam surface 180, and on its outer end is a projecting portion 181 having an upwardly-inclined cam face 182.

As a means of insuring complete movement of the operating handle 114 through its operating strokes, there is provided a full stroke mechanism including a double-ended pawl 183, adapted to engage a toothed disc 184 secured to shaft 113 and having a projection 185 overlying the disc 184 for tripping engagement with either lug 186 or pin 187. A spring-urged toggle linkage 188 assures the continued angular position of pawl 183 until altered by lug 186 or pin 187. A means is provided for preventing operation of the handle 114 until insertion of the customer's control unit B, said means including a spring-urged lever 190 pivoted at 191 at one end, and having its opposite end extending upwardly and then forward in the form of a nose 192 projecting into the path of the register base 1 (Figure 51). The lever 190 is further provided with a depending stop face 193 adapted to be engaged by an extending portion 194 of link 116.

With the parts in the positions shown in Figures 43 and 44, it will be seen that normally no angular anti-clockwise motion of the shaft 113 can occur, due to contact of extension 194 with stop ledge 193. Since the lever 172 has been previously pivoted outwardly by contact of surface 180 on crank arm 115 with projection 174 to move the tab 171 and ledge 173 laterally away from the slide bar 165, it will be seen that this bar may be moved downwardly against spring 169, and such movement will take place as the customer's control unit B is inserted into the guides 161, as shown in broken lines in Figure 44, since the pin 166 has its upper portion beveled for camming action with the base 1 of the control unit. Continued inserting movement of the unit B will bring one edge of the base 1 against pin 167 while the opposite edge passes pin 166 and allows the bar 165 to again assume its upper position, as urged by spring 169. Further movement of the control unit against pin 167 will slide the bar 165 rearwardly until the pins reach the ends of their respective slots and the gear 7 of the control unit B engages gear 134 (Figures 52 and 53). In this position, projection 163 has entered opening 39 in the casing of the control unit and released the control unit locking lever 136, at the same time base 1 of the control unit will engage the nose 192 of lever 190 (Figure 51) and move the lever ledge 193 rearwardly away from link end 194. At this point the control unit B may be removed from or again inserted freely, since there has been no actual locking of the control unit in place. However, initial angular movement of the handle 114 causes similar movement of crank arm 115 in a direction away from projecting portion 174 of lever 172, thus allowing this lever to move towards slide bar 165, as urged by spring 195. From Figures 52, 53 and 54, it will be apparent that in this position of parts, the slide bar 165 is prevented from longitudinal and vertical movement by the tab 171 overlying the end of the bar and portion 173 underlying the bar, thereby completely locking the control unit B in operating position. Continued movement of the handle 114 will rotate the turn-table 102 to dispense an article of merchandise, and cause longitudinal movement of rack bar 139 to set up the price of such article of merchandise in the counter 3 of the customer control unit B, as previously disclosed. Figures 50 through 54 show this condition of parts at the time nine units (9¢) have been removed from counter 130 and accumulated in the register or counter 3 of the customer control unit. The relation of parts is such that the transfer of units between counters 130 and 3, will have been completed just prior to the completion of the initial angular stroke of handle 114; in other words, an "idle" movement is provided at the end of such stroke. Such idle movement is used to disengage the gear 7 of the customer's control unit B from gear 134, so that upon return movement of the handle, no reverse rotation of gear 7 and counter 3 will take place. This disengaging movement of control unit B is accomplished by first moving tab 171 of lever 172 laterally away from slide bar 165, by contact of arm portion 181 with spring nose 176. However, vertical movement of bar 165 is prevented, since portion 173 of lever 172 continues to underlie the bar, as shown in Figures 55 and 56. Final movement of handle 114 will cause engagement of lug 179 with lever 178 to move the slide bar 165 and control lever B forward to the position shown in Figures 62, 63 and 64. It will be here noted that portion 181 of arm 115 has now passed spring nose 176 to allow angular movement of lever to again bring tab 111 into bar locking engagement with notch 170. In addition, this final movement reverses the position of the full stroke pawl 183 by contact of pin 187 with pawl projection 185. With this position of parts, as previously explained, the turn-table 102 has been rotated to expose an article of merchandise to the customer.

After removal of the article of merchandise, releasing pin 126 from arm opening 127, the handle 114 may be moved in the opposite direction to again bring the interlocking parts to the position shown in Figure 43. During such movement, arm portion 181 will pass nose 176 without causing unlocking movement of lever 165, since cam surface 182 on portion 181 will merely cause flexing of the spring arm 175. At the completion of this handle movement, surface 180 of arm 115 will contact projection 174 to move the lever 172 laterally, so that tab 171 and portion 173 will clear the bar 165, thus allowing the customer's control unit B to be readily removed from the slide by downward camming of pin 166 and bar 165. In addition, the full stroke mechanism is reversed by contact of lug 186 with pawl projection 185, to prepare the mechanism for the operation of dispensing another article of merchandise upon again inserting a customer's control unit B. The pricing mechanism, including price counter 130 and item counter 155, is enclosed by the housing 104, such housing having an opening 196 for exposing the number wheels or discs of counter 130. As shown in Figure 49, a portion of the housing is cut away for access to the serrated disc 146 and lever 147 for manual price setting of counter 130 and to counter 155 for noting the number of dispensed articles of merchandise registered thereon. This opening is adapted to be concealed by a hinged cover 197, which may be secured in its closed position by a locking means 198.

It is believed that the foregoing clearly describes the construction and principal of operation of the merchandising apparatus illustrated in the drawings, but I wish it to be understood that my invention is not limited to an apparatus composed of parts of mechanisms of the specific design or exact construction herein disclosed, as my broad idea consists of a merchandising apparatus composed of a number of co-acting devices, mechanisms, or instrumentalities constructed and arranged so as to attain the following results, i. e.: Display merchandise in conveniently arranged and easily accessible, locked compartments or dispensers, in which articles of merchandise are positioned; enable customers to readily see, and if desired, carefully inspect, merchandise, without being able to obtain possession of an article without first inserting a control device in the dispenser in which the article is housed; produce evidence of a customer's act of obtaining possession of an article by causing the sales price of that article to be registered or recorded in a control unit which the customer must surrender to the store cashier when making payment for his purchases; eliminate the possibility of arguments with customers, arising through failure of a customer to pick up and obtain possession of an article whose sale price has been registered in the customer's control unit; enable the store owner to easily change or vary the mechanism of the merchandise dispensers employed to cause the sale price of an article to be transferred into the customer's control unit; eliminate the possibility of a dishonest customer changing the condition of his control unit so as to make it indicate a lesser amount than the total amount of the merchandise obtained by the customer; eliminate the possibility of a dishonest cashier changing the amount registered in or indicated by the customer's control unit, and make it necessary for the cashier to utilize the customer's control unit to actuate or set up in the store totalizer, numbers, which, when added together, produce the total of the sales for a certain period of time; and effectively prevent a careless cashier from making an overcharge or undercharge and prevent a dishonest cashier from charging a customer less than the amount which the customer should pay for the merchandise he takes out of the store.

As previously stated, some of the mechanisms or devices of the merchandising apparatus herein illustrated, i. e., the part referred to as a customer's control unit, and the part referred to as a store totalizer and re-setting device, are capable of various other uses. Said co-acting devices are desirable, in that the device in which the numbers are added together to produce the total of a group of actions or transactions (the customer's control unit) is portable and has no pawls, ratchets or similar parts that are not absolutely reliable in operation, or which are liable to get out of order when the device is roughly handled; it is of such design that it can be easily serviced, and it is provided with a conventional or standard gear type counter or register, that is inexpensive to purchase and easy to obtain in the open market, due to the fact that many companies manufacture such a gear type counter. The totalizer into which amounts are transferred so as to indicate or record the total of a plurality of separate transactions or groups of transactions, is also preferably equipped with a conventional gear type counter, and the means used to determine the zero position or starting position of the counters of the portable adding devices, has the desirable characteristic of being absolutely reliable in operation, notwithstanding the fact that the counter or register whose starting or zero position it controls is of a type in which all of the units wheels of the counter cannot be restored to zero simultaneously, or at the same time, but instead, must be restored to zero, one after the other, or by progressive movement of the units wheels.

Having thus described my invention, what I claim as new and desire to secure by Letters Patent is:

1. An apparatus, comprising an adding device provided with a geared type counter that is adapted to be driven forwardly to set up different amounts in said counter, said counter comprising a group of units wheels directly connected with each other at all times by inter-meshing gears, a totalizer provided with a separate counter of the same type above mentioned, said adding device being provided with a driving gear that is adapted to be meshed with a driven gear forming part of the counter of the totalizer, an operating mechanism for driving the counter of the adding device rearwardly so as to restore it to its starting position and for causing the amount set up in the counter of said adding device to be transferred into the counter of the totalizer, and a stop mechanism that renders said operating mechanism inactive after the counter of the adding device has been restored to its starting position, said stop mechanism comprising two co-acting parts that are in engagement with each other when the counter of the adding device is in its starting position, and are moved at different rates of speed out of operative engagement with each other when said counter is driven forwardly to add or set up different amounts in said counter.

2. An apparatus, comprising an adding device provided with a geared type counter that is adapted to be driven forwardly to set up different amounts in said counter, said counter comprising a group of units wheels directly connected with each other at all times by inter-meshing gears, a totalizer provided with a separate counter of the same type above mentioned, said adding device being provided with a driving gear that is adapted to be meshed with a driven gear forming part of the counter of the totalizer, an operating mechanism for driving the counter of the adding device rearwardly so as to restore it to its starting position and for causing the amount set up in the counter of said adding device to be transferred into the counter of the totalizer, and a stop mechanism for determining the starting position of the counter of said adding device, said stop mechanism comprising two oppositely rotating parts having different rates of speed arranged so that they are in engagement with each other only when the counter of said adding device is in its starting position.

3. An apparatus, comprising an adding device provided with a geared type counter that is adapted to be driven forwardly to set up different amounts in said counter, said counter comprising a group of units wheels directly connected with each other at all times by inter-meshing gears, a totalizer provided with a separate counter of the same type above mentioned, said adding device being provided with a driving gear that is adapted to be meshed with a driven gear forming part of the counter of the totalizer, an operating mechanism for driving the counter of the adding device rearwardly so as to restore it to its starting position and for causing the amount set up in the counter of said adding device to be transferred into the counter of the totalizer, a stop mechanism for determining the starting position of the counter of the adding device, said stop mechanism comprising a worm driven by said counter, a pair of oppositely-rotating gears meshing with said worm and having different numbers of teeth, co-acting devices carried by said worm gears that are in engagement with each other only when the counter is in its starting position, and a stop element that is rendered active automatically when the co-acting devices on said worm gears are engaged during the operation of clearing the counter of said adding device.

4. An apparatus, comprising an adding device provided with a geared type counter that is adapted to be driven forwardly to set up different amounts in said counter, said counter comprising a group of units wheels directly connected with each other at all times by inter-meshing gears, a totalizer provided with a separate counter of the same type above mentioned, said adding device being provided with a driving gear that is adapted to be meshed with a driven gear forming part of the counter of the totalizer, an operating mechanism for driving the counter of the adding device rearwardly so as to restore it to its starting position and for causing the amount set up in the counter of said adding device to be transferred into the counter of the totalizer, a stop mechanism for determining the starting position of the counter of said adding device, said stop mechanism comprising a worm directly connected with the counter of said adding device so as to rotate in one direction during the operation of setting up numbers in said counter and rotated in the reverse direction when said counter is being cleared, a pair of oppositely-rotating worm gears in mesh with said worm and provided with different numbers of teeth, a rigid device on one worm gear and a pivoted device on the other worm gear, arranged so as to be in engagement with each other only when said counter is in its starting position, and a stop element governed by the engagement of said rigid and pivoted devices.

5. An apparatus, comprising a totalizer provided with a counter comprising units wheels directly connected with each other by meshed gears, an operating mechanism provided with a motor, a portable adding device provided with a similar type counter and comprising gears that are adapted to be meshed with co-acting gears on said operating mechanism and on the counter of the totalizer when it is desired to transfer the number set up in the counter of the adding device into the counter of the totalizer, a manually-operable means for causing said motor to start operating, means for automatically stopping said motor when the counter of the adding device is restored to starting position during the operation of transferring a number into the counter of the totalizer, a stop mechanism for automatically stopping said motor, said stop mechanism comprising a worm directly connected with the counter of the adding device, oppositely rotating gears driven by said worm and provided with different numbers of teeth, co-acting devices on said worm gears that are in engagement with each other only when the counter of the adding device is in its starting position, and a stop element whose position is governed by the co-acting devices on said worm gears.

JOHN J. NOONAN.

REFERENCES CITED

The following references are of record in the file of this patent:

UNITED STATES PATENTS

| Number | Name | Date |
|---|---|---|
| 1,404,280 | Dixon et al. | Jan. 24, 1922 |
| 1,454,108 | Dixon et al. | May 8, 1923 |
| 1,603,402 | Pitney | Oct. 19, 1926 |
| 2,127,769 | Esgro | Aug. 23, 1938 |
| 2,272,460 | Green | Feb. 10, 1942 |
| 2,313,424 | Esgro | Mar. 9, 1943 |